(12) United States Patent
Cao

(10) Patent No.: US 12,362,804 B2
(45) Date of Patent: Jul. 15, 2025

(54) ELECTRONIC DEVICE, WIRELESS COMMUNICATION METHOD, AND COMPUTER READABLE STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 572 days.

(21) Appl. No.: 17/641,100

(22) PCT Filed: Sep. 30, 2020

(86) PCT No.: PCT/CN2020/119149
§ 371 (c)(1),
(2) Date: Mar. 8, 2022

(87) PCT Pub. No.: WO2021/068817
PCT Pub. Date: Apr. 15, 2021

(65) Prior Publication Data
US 2022/0338023 A1    Oct. 20, 2022

(30) Foreign Application Priority Data
Oct. 12, 2019    (CN) .......................... 201910967620.5

(51) Int. Cl.
*H04W 16/28*    (2009.01)
*H04B 17/336*    (2015.01)
*H04W 24/10*    (2009.01)

(52) U.S. Cl.
CPC .......... *H04W 16/28* (2013.01); *H04B 17/336* (2015.01); *H04W 24/10* (2013.01)

(58) Field of Classification Search
CPC ..... H04W 16/28; H04W 24/10; H04B 17/336
See application file for complete search history.

(56) References Cited

U.S. PATENT DOCUMENTS

2019/0109626 A1    4/2019   Park
2021/0099271 A1*   4/2021   Zhang .................. H04L 5/0057

FOREIGN PATENT DOCUMENTS

CN    109391992 A    2/2019
CN    110034798 A    7/2019
(Continued)

OTHER PUBLICATIONS

International Search Report and Written Opinion mailed on Jan. 4, 2021, received for PCT Application PCT/CN2020/119149, Filed on Sep. 30, 2020, 9 pages including English Translation.
(Continued)

*Primary Examiner* — Rhonda L Murphy
(74) *Attorney, Agent, or Firm* — XSENSUS LLP

(57) ABSTRACT

An electronic device includes a processing circuit, configured to: configure one or multiple CMR and one or multiple IMR, and use a transmission beam corresponding to the one or multiple CMR to send a downlink signal to a user device, such that the user device: uses a receiving beam to receive the downlink signal from the transmission beam; determines the signal power on the basis of the signal quality measured on the CMR and determines the interference power on the basis of the signal quality measured on the IMR; and, on the basis of the signal power and the interference power, determines the signal-to-noise ratio between the transmission beam and the receiving beam. The device and process enables a network side device and the user device can more rationally select a transmission beam and a receiving beam.

18 Claims, 10 Drawing Sheets

(56) References Cited

FOREIGN PATENT DOCUMENTS

CN         110050427 A     7/2019
WO    WO-2018062833 A1     4/2018

OTHER PUBLICATIONS

Apple Inc., "Remaining Issues On Multi-Beam Operation", 3GPP TSG-RAN WG1 Meeting #98bis, R1-1910969, Oct. 14-20, 2019, 14 pages.
Sony, "Enhancements On Multi-Beam Operation", 3GPP TSG RAN WG1#98bis, R1-1910750, Oct. 14-20, 2019, 7 pages.
ZTE, "Enhancements On Multi-Beam Operation" 3GPP TSG RAN WG1 Meeting #98bis, R1-1910285, Oct. 14-20, 2019, 24 pages.

* cited by examiner

ELECTRONIC DEVICE, WIRELESS COMMUNICATION METHOD, AND COMPUTER READABLE STORAGE MEDIUM

CROSS-REFERENCE TO RELATED APPLICATIONS

The present application is based on PCT/CN2020/119149 filed on Sep. 30, 2020, which claims priority to Chinese Patent Application No. 201910967620.5, titled "ELECTRONIC DEVICE, WIRELESS COMMUNICATION METHOD, AND COMPUTER READABLE STORAGE MEDIUM", filed on Oct. 12, 2019 with the China National Intellectual Property Administration, each of which is incorporated herein by reference in its entirety.

FIELD

Embodiments of the present disclosure generally relate to the field of wireless communications, and in particular to an electronic device, a wireless communication method, and a computer-readable storage medium. More specifically, the present disclosure relates to an electronic device serving as a network-side device in a wireless communication system, an electronic device serving as user equipment in a wireless communication system, a wireless communication method performed by a network-side device in a wireless communication system, a wireless communication method performed by user equipment in a wireless communication system, and a computer-readable storage medium.

BACKGROUND

Beamforming is a signal preprocessing technology based on an antenna array. In beamforming, a directional beam is generated by modifying a weighting coefficient of each element in the antenna array, thereby obtaining significant array gain. Therefore, the beamforming has great advantages in terms of expanding coverage, improving edge throughput, and interference suppression. In a process of beam scanning, a network-side device sends a downlink signal to user equipment with multiple transmitting beams, and the user equipment receives the downlink signal with multiple receiving beams and measures channel quality between a transmitting beam and a receiving beam, for example, RSRP (reference signal receiving power). The network-side device determines a transmitting beam for sending downlink information based on channel quality information. The user equipment determines a receiving beam for receiving the downlink information based on the channel quality information.

The network-side device carries the downlink signal through measurement resources. Different measurement resources correspond to the same transmitting beam, or correspond to different transmitting beams. In a case that the network-side device utilizes a specific transmitting beam to send a downlink signal to the user equipment through a measurement resource, the user equipment measures the channel quality between the transmitting beam and the receiving beam based on the measurement resource. Therefore, the measurement resource is called a channel measurement resource (CMR) for the user equipment. However, the downlink signal carried on this measurement resource may be an interference signal for another user equipment. Therefore, the measurement resource is called interference measurement resource (IMR) for another user equipment.

It can be seen that the user equipment simply calculating the RSRP cannot reflect intra-cell interference received h the user equipment, and thus cannot accurately reflect the channel quality between the transmitting beam and the receiving beam. Therefore, it is necessary to propose a technical solution so that the channel quality between the transmitting beam and the receiving beam calculated by the user equipment can reflect the interference, thereby facilitating reasonable selection of a transmitting beam by the network-side device and reasonable selection of a receiving beam by the user equipment.

SUMMARY

This part provides a general summary rather than a full disclosure of full scope or all features of the present disclosure.

An electronic device, a wireless communication method, and a computer-readable storage medium are provided according to the present disclosure. Channel quality between a transmitting beam and a receiving beam calculated by user equipment can reflect interference, thereby facilitating reasonable selection of a transmitting beam by a network-side device and reasonable selection of a receiving beam by the user equipment.

An electronic device is provided according to an aspect of the present disclosure. The electronic device includes processing circuitry. The processing circuitry is configured to: configure one or more channel measurement resources CMR and one or more interference measurement resources IMR; and send a downlink signal to user equipment with a transmitting beam corresponding to the one or more CMRs, such that the user equipment: receives the downlink signal from the transmitting beam with a receiving beam, determines signal power according to signal quality measured on the CMR, determines interference power according to signal quality measured on the IMR, and determines a signal to interference plus noise ratio between the transmitting beam and the receiving beam according to the signal power and the interference power.

An electronic device is provided according to another aspect of the present disclosure. The electronic device includes processing circuitry. The processing circuitry is configured to: receive with the receiving beam, a downlink signal of a transmitting beam corresponding to one or more channel measurement resources CMR from a network-side device, where the network-side device configures one or more CMRs and one or more interference measurement resources IMR; determine signal power according to signal quality measured on the CMR, determine interference power according, to signal quality measured on the IMR, and determine a signal to interference plus noise ratio between the transmitting beam and the receiving beam according to the signal power and the interference power.

A wireless communication method performed by an electronic device is provided according to another aspect of the present disclosure. The method includes: configuring one or more channel measurement resources CMR and one or more interference measurement resources IMR; and sending a downlink signal to user equipment with a transmitting beam corresponding to the one or more CMRs, such that the user equipment: receives the downlink signal from the transmitting beam with a receiving beam determines signal power according to signal quality measured on the CMR, determines interference power according to signal quality measured on the IMR, and determines a signal to interference plus noise ratio between the transmitting beam and the receiving beam according to the signal power and the interference power.

A wireless communication method performed by an electronic device is provided according to another aspect of the present disclosure. The method includes: receiving, with a receiving beam, a downlink signal of a transmitting beam corresponding to one or more channel measurement resources CMR from a network-side device, where the network-side device configures one or more CMRs and one or more interference measurement resources IMR; determining signal power according to signal quality measured on the CMR, determining interference power according to signal quality measured on the IMR, and determining a signal to interference plus noise ratio between the transmitting beam and the receiving beam according to the signal power and the interference power.

A computer-readable storage medium is provided according to another aspect of the present disclosure. The computer-readable storage medium includes executable computer instructions that, when executed by a computer, cause the computer to perform the wireless communication method according to the present disclosure.

With the electronic device, the wireless communication method, and the computer-readable storage medium according to the present disclosure, the network-side device configures one or more CMRs and one or more IMRs, and sends a downlink signal to user equipment with a transmitting beam corresponding to the one or more CMRs. The user equipment receives the downlink signal with a receiving beam, determines the signal power according to the signal quality measured on the CMR, and determines the interference power according to the signal quality measured on the IMR, so as to determine the signal to interference plus noise ratio between the transmitting beam and the receiving beam according to the signal power and the interference power. Therefore, the channel quality between the transmitting beam and the receiving beam calculated by the user equipment can reflect interference, thereby facilitating reasonable selection of a transmitting beam by a network-side device and reasonable selection of a receiving beam by the user equipment.

From the description herein, further areas of applicability will become apparent. The description and specific examples in this summary are for illustrative only, and are not intended to limit the scope of the present disclosure.

BRIEF DESCRIPTION OF THE DRAWINGS

The drawings described herein are only for illustrating selected embodiments rather than all possible implementations, and are not intended to limit the scope of the present disclosure. In the drawings.

Figure 1:
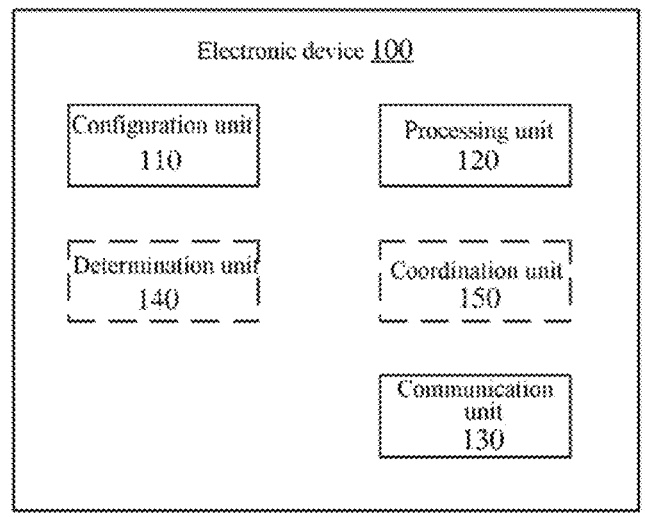
FIG. 1 is a block diagram showing an example of configuration of an electronic device as a network-side device according to an embodiment of the present disclosure.

Although the present disclosure is susceptible to various modifications and replacements, specific embodiments of the present disclosure are shown in the drawings as examples and described in detail herein. However, it should be understood that the description of specific embodiments herein is not intended to limit the present disclosure to the specific forms disclosed. Instead, the present disclosure is intended to cover all modifications, equivalents, and replacements falling within the spirit and scope of the present disclosure. It should be noted that throughout the drawings, the same reference numeral indicates similar components.

DETAILED DESCRIPTION OF EMBODIMENTS

Examples of the present disclosure are described more fully with reference to the drawings. The following description is merely illustrative, and is not intended to limit the present disclosure, application, or use.

Example embodiments are provided so that the present disclosure is thorough and the scope of the present disclosure is fully conveyed to those skilled in the art. Numerous specific details such as examples of specific components, devices, and methods are described to provide a detailed understanding; of the embodiments of the present disclosure. It is apparent to those skilled in the art that the example embodiments may be implemented in various forms without the specific details, and none of them should be construed as limiting the scope of the present disclosure. In some example embodiments, well-known processes, well-known structures, and well-known technologies are not described in detail.

Description is in the following order.
1. Configuration example of network-side device;
2. Configuration example of user equipment;
3. Method embodiments; and
4. Application examples.

1. Configuration Example of Network-Side Device

FIG. 1 is a block diagram showing an example of the configuration of an electronic device 100 according to an embodiment of the present disclosure. The electronic device 100 here may serve as a network-side device in a wireless communication system, and specifically serves as a base station device in the wireless communication system.

As shown in FIG. 1, the electronic device 100 includes a configuration unit 110, a processing unit 120, and a communication unit 130.

Here, each unit of the electronic device 100 may be included in processing circuitry. It should be noted that the electronic device 100 may include one processing circuitry or multiple processing circuitry. Further, the processing circuitry may include various discrete functional units to perform various functions and/or operations. It should be noted that these functional units may be physical entities or logical entities, and units with different names may be implemented by the same physical entity.

According to an embodiment of the present disclosure, the configuration unit 110 configures one CMR or more CMRs and one IMR or more IMRs.

According to an embodiment of the present disclosure, the processing unit 120 controls the execution of a beam scanning process. For example, in a P2 process, the processing unit 120 controls the electronic device 100 to send, with each of multiple transmitting beams, a downlink signal to the user equipment. For another example, in a P3 process, the processing unit 120 controls the electronic device 100 to send, with the same transmitting beam, a downlink signal to the user equipment.

In the conventional technology, the P2 process and the P3 process are important stages in the beam scanning process. The network-side device selects a suitable transmitting beam according to the P2 process, and the user equipment selects a suitable receiving beam according to the P3 process. Specifically, in the P2 process, the network-side device sends, with each of multiple transmitting beams, a downlink signal to the user equipment, and the user equipment receives the downlink signal with the same receiving beam. In this way, the user equipment measures, for each of multiple transmitting beams, channel quality between the transmitting beam and the receiving beam, and feeds back the measured channel quality to the network-side device. Therefore, the network-side device knows a transmitting beam that the user equipment expects the network-side device to utilize, and then determines a suitable transmitting beam to perform a data transmission process. In the P3 process, the network-side device sends a downlink signal to the user equipment with one transmitting beam, and the user equipment receives the downlink signal with multiple receiving beams. In this way, the user equipment measures, for each of the multiple receiving beams, channel quality between the transmitting beam and the receiving beam, and thereby determines a suitable receiving beam to perform the data transmission process.

According to an embodiment of the present disclosure, the electronic device 100 sends, with a transmitting, beam corresponding to the one or more CMRs, a downlink signal to the user equipment via the communication unit 130, such that the user equipment: receives the downlink signal from the transmitting beam with a receiving beam, determines signal power according to signal quality measured on the CMR, determines interference power according to signal quality measured on the IMR, and determines a signal to interference plus noise ratio between the transmitting beam and the receiving beam according to the signal power and the interference power.

It can be seen that the electronic device 100 according to the embodiment of the present disclosure configures one or more CMRs and one or more IMRs, and sends, with the transmitting beam corresponding to the one or more CMRs, the downlink signal to the user equipment, such that the user equipment: receives the downlink signal with the receiving beam, determines the signal power according to signal quality measured on the CMR, determines the interference power according to signal quality measured on the IMR, and determines the signal to interference plus noise ratio between the transmitting beam and the receiving beam. In this way, the channel quality between the transmitting beam and the receiving beam calculated by the user equipment can reflect the interference, thereby facilitating reasonable selection of a transmitting beam by the network-side device and reasonable selection of a receiving beam by the user equipment.

In the embodiment of the present disclosure, the CMR may be a CSI-RS (Channel State Information-Reference Signal) resource or an SSB (Synchronization Signal Block) resource. The IMR may be to CSI-RS resource or a SSB resource. Further, the CMR may be an NZP (Non Zero Power)-CMR, and the IMR may be an NZP-IMR.

According to an embodiment of the present disclosure, the configuration unit 110 may configure K CMRs respectively corresponding to K transmitting beams, and configure, for each of the K CMRs, one or more IMRs corresponding to the CMR, where K is an integer greater than 1. Further, the electronic device 100 sends, with each of the K transmitting beams, a downlink signal to the user equipment via the communication unit 130, so that the user equipment receives the downlink signal from each transmitting beam with the same receiving beam.

Figure 2:
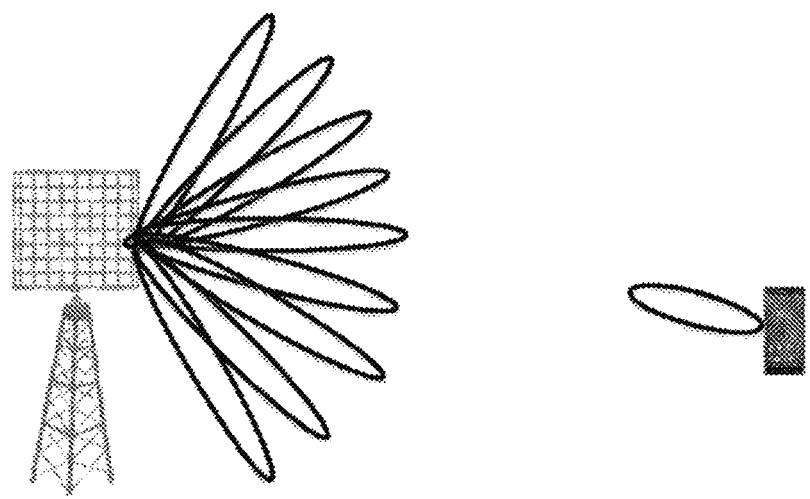
FIG. 2 is a schematic diagram showing a P2 process according to the conventional technology.

FIG. 2 is a schematic diagram showing a P2 process according to the conventional technology. As shown in FIG. 2, in the P2 process, the network-side device sends, with each of the multiple transmitting beams, a downlink signal to the user equipment, and the user equipment receives the downlink signal with the same receiving beam. In this way, the user equipment calculates, for each of the multiple transmitting beams, channel quality between the transmitting beam and the receiving beam, so that the network-side device determines a suitable transmitting beam according to the channel quality calculated by the user equipment to perform the data transmission process.

Figure 3:
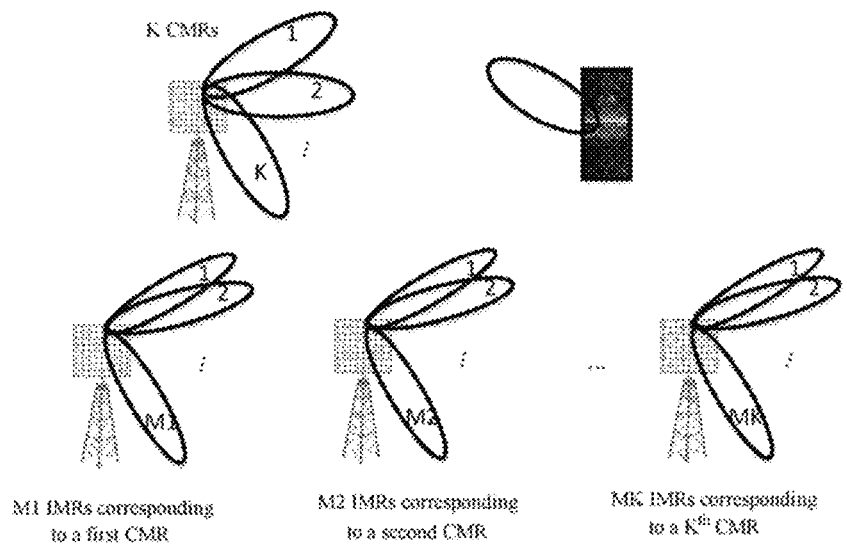
FIG. 3 is a schematic diagram showing the configuration of CMR and IMR in the P2 process according to an embodiment of the present disclosure.

FIG. 3 is a schematic diagram showing the configuration of CMR and IMR in the P2 process according to an embodiment of the present disclosure. As shown in FIG. 3, the configuration unit 110 may configure K CMRs respectively corresponding to the K transmitting beams, and configure Mk IMRs corresponding to a $k^{th}$ CMR. k is an integer from 1 to K, K is an integer greater than 1, and Mk is a positive integer. Here, M1 to MK are equal or different. That is, the configuration unit 110 may configure the same number of IMRs for each CMR. Alternatively, the number of IMRs configured by the configuration unit 110 for a CMR is different from the number of IMRs configured by the configuration unit 110 for another CMR. Further, the configuration unit 110 may configure the one or more IMRs that are identical for each CMR, or configure one or more IMRs that ate different for each CMR. In addition, the K transmitting beams may be all the transmitting beams of the electronic device 100. Here, the Mk IMRs corresponding to the $k^{th}$ transmitting beam refer to transmitting beams that need to be considered to cause interference to user equipment when the electronic device 100 sends a downlink signal to the user equipment with the $k^{th}$ transmitting beam.

According to an embodiment of the present disclosure, for a transmitting beam, the user equipment determines signal power between the transmitting beam and the receiving beam of the user equipment according to the signal quality measured on the CMR corresponding to the transmitting beam, determines interference power between the transmitting beam and the receiving beam of the user equipment according to the signal quality measured on all or pan of the IMRs corresponding to the CMR, and determines a signal to interference plus noise ratio between the transmitting beam and the receiving beam of the user equipment according to the signal power and the interference power.

For example, for a first transmitting beam corresponding to a first CMR, the user equipment determines signal power between the first transmitting beam and the receiving beam of the user equipment according to signal quality measured on the first CMR, determines interference power between the first transmitting beam and the receiving beam of the user equipment according to signal quality measured on all or part of M1 IMRs corresponding to the first CMR, and determines a signal to interference plus noise ratio between the first transmitting beam and the receiving beam of the user equipment according to the signal power and the interference power.

Similarly, for a second transmitting beam corresponding to a second CMR, the user equipment determines signal power between the second transmitting beam and the receiving beam of the user equipment according to signal quality measured on the second CMR, determines interference power between the second transmitting beam and the receiving beam of the user equipment according to signal quality measured on all or part of M2 IMRs corresponding to the second CMR, and determines a signal to interference plus noise ratio between the second transmitting beam and the receiving beam of the user equipment according to the signal power and the interference power. In this way, for each of the K transmitting beams, the user equipment determines the signal to interference plus noise ratio between the transmitting beam and the receiving beam of the user equipment. Therefore, the user equipment can more accurately understand the channel conditions of each beam.

According to an embodiment of the present disclosure, the configuration unit 110 may configure one or more IMRs corresponding to each CMR through RRC (Radio Resource Control) signaling, so that the user equipment determines the interference power according to the signal quality measured on all IMRs corresponding to the CMR. For example, for the first transmitting beam corresponding to the first CMR, the user equipment determines the interference power between the first transmitting beam and the receiving beam of the user equipment according to the signal quality measure all the M1 IMRs corresponding to the first CMR.

According to the embodiment of the present disclosure, the configuration unit 110 configures one or more IMRs for each CMR through the RRC signaling, and activates one or more of the IMRs corresponding to the CMR through MAC (Media Access Control) signaling, such as MAC CE (Control Element), or DCI (Downlink Control Information), so that the user equipment determines the interference power according to the signal quality measured on the activated IMR corresponding to the CMR. For example, among the M1 IMRs corresponding to the first CMR (assuming that M1 is an integer greater than or equal to 3), a first IMR and a third IMR are activated. The user equipment determines the interference power between the first transmitting beam and the receiving beam of the user equipment according to the signal quality measured on the first IMR and the third IMR among the M1 IMRs corresponding to the first CMR.

According to an embodiment of the present disclosure, the electronic device 100 receives signal to interference plus noise ratio information from the user equipment through the communication unit 130. The signal to interference plus noise ratio information includes a signal to interference plus noise ratio between each of one or more of the K transmitting beams and the receiving beam.

According to an embodiment of the present disclosure, as shown in FIG. 1, the electronic device 100 further includes a determining unit 140. The determining unit 140 is configured to determine a signal to interference plus noise ratio between each of the one or more of the K transmitting beams and the receiving beam according to the signal to interference plus noise ratio information.

According to an embodiment of the present disclosure, the signal to interference plus noise ratio information further includes, for each signal to interference plus noise ratio, identification information of the CMR for which the signal to interference plus noise ratio is directed, so that the determining unit 140 determines, for each signal to interference plus noise ratio, a CMR or transmitting beam corresponding to the signal to interference plus noise ratio.

According to an embodiment of the present disclosure, the signal to interference plus noise ratio information includes one signal to interference plus noise ratio. For example, the user equipment reports only a maximum of all signal to interference plus noise ratios. Alternatively, the signal to interference plus noise ratio information includes multiple signal to interference plus noise ratios. For example, the user equipment reports a maximum and a minimum of all signal to interference plus noise ratios.

According to an embodiment of the present disclosure, the user equipment determines the interference power according to all or pan of activated IMRs among the IMRs corresponding to the CMR, and the electronic device 100 knows in advance the IMR for which the signal to interference plus noise ratio is directed. Therefore, the signal to interference plus noise ratio information includes only a CMR identifier and the signal to interference plus noise ratio. Table 1 shows an example of signal to interference plus noise ratio information received by the electronic device 100.

TABLE I

|  | CMR identifier | Value of signal to interference plus noise ratio |
|---|---|---|
| First signal to interference plus noise ratio | CMR1 | SINR1 |
| ... | ... | ... |
| $P^{th}$ signal to interference plus noise ratio | CMR5 | SINRP |

Alternatively, according to an embodiment of the present disclosure, the configuration unit 110 configures one or more IMRs for each CMR through RRC signaling. The user equipment selects a part among the IMRs corresponding to the CMR to determine the interference power. In this case, the electronic device 100 does not know, for each signal to interference plus noise ratio, a IMR for which the signal to interference plus noise ratio is directed. Therefore, the signal to interference plus noise ratio information further includes, for each signal to interference plus noise ratio, identification information of one or more IMRs corresponding to the signal to interference plus noise ratio.

According to an embodiment of the present disclosure, the user equipment selects a part among the IMRs corresponding to the CMR determine the interference power. Therefore, for a CMR or transmitting beam, the user equipment may determine multiple signal to interference plus noise ratios according to different IMR combinations. For example, among the M1 IMRs corresponding to the first CMR, the user equipment selects a first IMR and a second IMR to calculate a signal to interference plus noise ratio, or selects a third IMR to calculate another signal to interference plus noise ratio. Therefore, the signal to interference plus noise ratio information received by the electronic device 100 includes one or more signal to interference plus noise ratios for each transmitting beam.

Table 2 shows another example of signal to interference plus noise ratio information received by the electronic device 100.

TABLE 2

| | CMR identifier | IMR identifier | Value of signal to interference plus noise ratio |
|---|---|---|---|
| First signal to interference plus noise ratio | CMR1 | IMR1 + IMR2 | SINR1 |
| Second signal to interference plus noise ratio | CMR1 | IMR5 | SINR2 |
| ... | ... | ... | ... |
| $P^{th}$ signal to interference plus noise ratio | CMR5 | IMR3 + IMR6 | SINRP |

According to an embodiment of the present disclosure, the configuration unit 110 configures the CMR and all IMRs corresponding to the CMR as a QCL (Quasi-co-located) Type D relationship. That is, the user equipment receives the CMR and all IMRs corresponding to the CMR with the same receiving beam.

According to an embodiment of the present disclosure, configuration unit 110 configures a TCI (Transmission Configuration Indication) state for the CMR to indicate to the user equipment a receiving beam for receiving the CMR. In this case, the configuration unit 110 configures no TCI state for all IMRs corresponding to the CMR, and the user equipment receives all the IMRs corresponding to the CMR with the receiving beam for receiving the CMR. Instead, the configuration unit 110 configures the TCI state for the IMR corresponding to the CMR, so as to indicate to the user equipment a receiving beam for receiving the IMR. In this case, the configuration unit 110 configures no TCI state for the CMR, and the user equipment receives the CMR with the receiving beam for receiving the IMR corresponding to the CMR.

According to an embodiment of the present disclosure, as shown in FIG. 1, the electronic device 100 further includes a coordination unit 150. The coordination unit 150 is configured to determine a suitable transmitting beam for sending downlink data to the user equipment according; to the signal to interference plus noise ratio information from the user equipment. For example, the coordination unit 150 selects a transmitting beam with a large signal to interference plus noise ratio to send downlink data to the user equipment, avoiding selecting a transmitting beam with a small signal to interference plus noise ratio to send downlink data to the user equipment.

In addition, the coordination unit 150 is further configured to determine a transmitting; beam for sending downlink data to another user equipment according to the signal to interference plus noise ratio information from the user equipment. For example, in a case that the signal to interference plus noise ratio information received by the electronic device 100 indicates that the signal to interference plus noise ratio of the user equipment is relatively small on the CMR1, IMR2, and IMR3, the electronic device 100 avoids utilizing IMR2 and IMR3 to send downlink data to another user equipment, so as to reduce interference to the user equipment.

As described above, in the P2 process, the electronic device 100 configures K CMRs respectively corresponding to the K transmitting beams, and configures, for of the K CMRs, one or more IMRs corresponding to the CMR. That is, one CMR is mapped to one or more IMRs. The electronic device 100 sends, with each of the K transmitting beams, a downlink signal to the user equipment. The user equipment receives the downlink signal with the same receiving beam, to determine, for each of the K transmitting beams, a signal to interference plus noise ratio between the transmitting beam and the receiving beam. Therefore, the channel quality between the transmitting beam and the receiving beam calculated by the user equipment can reflect interference, thereby facilitating reasonable selection of a transmitting beam by a network-side device and reasonable selection of a receiving beam by the user equipment.

According to an embodiment of the present disclosure, the configuration unit 110 configures N IMRs, and configures, for each of the N IMRs, one or more CMRs corresponding to the IMR. The one or more CMRs correspond to the same transmitting beam, and N is an integer greater than or equal to 1. Here, one or more CMRs corresponding to the IMR are identical, and correspond to the same transmitting beam. The CMR represents the channel measurement resource, and the transmitting beam represents a direction in which the beam is transmitted. Therefore, one or more CMRs corresponding to the same transmitting beam indicates that one or more channel measurement resources are utilized to send downlink signals in the same beam direction.

Figure 4:
FIG. 4 is a schematic diagram showing a P3 process according to the conventional technology.

FIG. 4 is a schematic diagram showing the P3 process according tip the conventional technology. As shown in FIG. 4, in the P3 process, the network-side device sends the downlink signal to the user equipment with one transmitting beam, and the user equipment receives the downlink signal with various receiving beams. In this way, the user equipment calculates, for each of the various receiving beams, channel quality between the transmitting beam and the receiving beam, thereby determining a suitable receiving beam to perform the data transmission process. FIG. 4 shows a case where the user equipment is provided with multiple receiving beams. Alternatively, the user equipment is provided with only one receiving beam.

Figure 5:
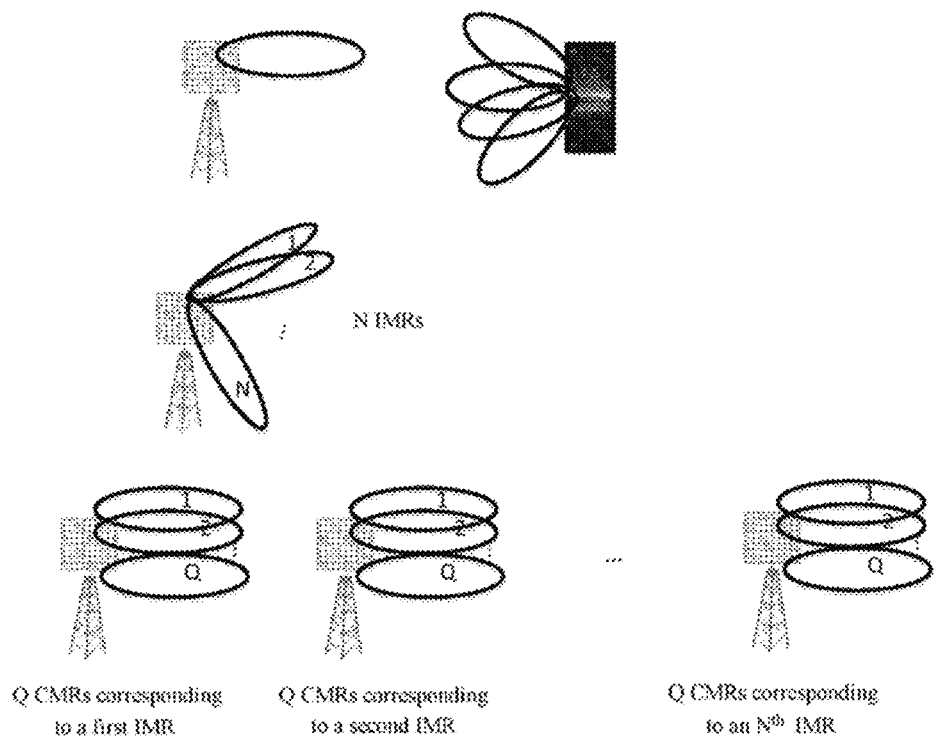
FIG. 5 is a schematic diagram showing the configuration of CMR and IMR in the P3 process according to an embodiment of the present disclosure.

FIG. 5 is a schematic diagram showing the configuration of CMR and IMR in the P3 process according to an embodiment of the present disclosure. As shown in FIG. 5, the configuration unit 110 configures N IMRs, and configures Q CMRs for each of the N IMRs, where N is a positive integer, and Q is a positive integer. Here, the Q CMRs configured for all the N IMRs are identical. That is, the Q CMRs corresponding to a first IMR are identical to the Q CMRs corresponding to a second IMR, until the Q CMRs corresponding to an $N^{th}$ IMR. Furthermore, the Q CMRs all correspond to the same transmitting beam, that is, the transmitting beam utilized by the network-side device in the process.

According to an embodiment of the present disclosure, Q is equal to the number of receiving beams of the user equipment. The user equipment receives, with Q receiving beams, the downlink signal from the same transmitting beam of the electronic device 100. Q CMRs are utilized to send downlink signals in the same transmitting beam direction, so as to respectively correspond to the Q receiving beams of the user equipment. Furthermore, the Q CMRs correspond to the same transmitting beam direction, and thereby correspond to the same N IMRs. That is, from the perspective of IMR, each of the N IMRs corresponds to the same Q CMRs.

According to an embodiment of the present disclosure, the electronic device 100 sends, with the same transmitting beam, a downlink signal to the user equipment via the communication unit 130. The user equipment receives the downlink signal with each of the one or more receiving beams. Further, for a receiving beam, the user equipment determines signal power according to signal quality measured on one or more CMRs, determines interference power according to signal quality measured on all or part of the N IMRs, and determines the signal to interference plus noise ratio between the transmitting beam and the receiving beam according to the signal power and the interference power. In this way, the user equipment determines, for each of the receiving beams, the signal to interference plus noise ratio between the transmitting beam and the receiving beam.

For example, for the first receiving beam, the user equipment determines the signal power between the transmitting beam and the first receiving beam of the user equipment according to the signal quality measured on Q CMRs, determines the interference power between the transmitting beam and the first receiving beam of the user equipment according to the signal quality measured on all or part of the N IMRs, and determines the signal to interference plus noise ratio between the transmitting beam and the first receiving beam of the user equipment according to the measured signal power and interference power.

Similarly, for the second receiving beam, the user equipment determines the signal power between the transmitting beam and the second receiving beam of the user equipment according to the signal quality measured on Q CMRs, determines the interference power between the transmitting beam and the second receiving beam of the user equipment according to the signal quality measured on all or part of the N IMRs, and determines the signal to interference plus noise ratio between the transmitting beam and the second receiving beam of the user equipment according to the measured signal power and interference power. In this way, the user equipment determines, for each of the one or more receiving beams of the user equipment, the signal to interference plus noise ratio between the transmitting beam and the receiving beam.

According to an embodiment of the present disclosure, the configuration unit 110 configures N IMRs through RRC signaling, so that the user equipment determines the interference power according to the signal quality measured on all the N IMRs. For example, for the first receiving beam, the user equipment determines the interference power between the transmitting beam and the first receiving beam of the user equipment according to the signal quality measured on all the N IMRs.

According to an embodiment of the present disclosure, the configuration unit 110 configures N IMRs through RRC signaling, and activates one or more of the N IMRs through MAC signaling, for example MAC CE, or DCI, so that the user equipment determines the interference power according to the signal quality measured on the activated IMR. For example, the configuration unit 110 activates the first IMR and the third IMR among the N IMRs. The user equipment determines, for each receiving beam of the user equipment, the interference power between the transmitting beam and the receiving beam according to the signal quality measured on the first IMR and the third IMR among the N IMRs.

According to an embodiment of the present disclosure, the electronic device 100 receives signal to interference plus noise ratio information from the user equipment via the communication unit 130. The signal to interference plus noise ratio information includes the signal to interference plus noise ratio between the transmitting beam and one or more receiving beams.

According to an embodiment of the present disclosure, the determining unit 140 determines, for each of the one or more receiving beams, a signal to interference plus noise ratio between the transmitting beam and the receiving beam according to the signal to interference plus noise ratio information.

According to an embodiment of the present disclosure, the signal to interference plus noise ratio information includes one signal to interference plus noise ratio. For example, the user equipment reports only a maximum of all signal to interference plus noise ratios. Alternatively, the signal to interference plus noise ratio information includes multiple signal to interference plus noise ratios. For example, the user equipment reports a maximum and a minimum of all signal to interference plus noise ratios.

According to an embodiment of the present disclosure, the user equipment determines the interference power according to all or activated IMRs among the N IMRs, and the electronic device 100 knows in advance the IMR for which the signal to interference plus noise ratio is directed. Therefore, the signal to interference plus noise ratio information includes only the signal to interference plus noise ratio. Table 3 shows an example of signal to interference plus noise ratio information received by the electronic device 100.

TABLE 3

| | Value of signal to interference plus noise ratio |
|---|---|
| First signal to interference plus noise ratio | SINR1 |
| ... | ... |
| $P^{th}$ signal to interference plus noise ratio | SINRP |

Alternatively, according to an embodiment of the present disclosure, the user equipment selects a part from N IMRs to determine the interference power. In this case, the electronic device 100 does not know, for each signal to interference plus noise ratio, the IMR for which the signal to interference plus noise ratio is directed. Therefore, the signal to interference plus noise ratio information further includes, for each signal to interference plus noise ratio, identification information of one or more IMRs corresponding to the signal to interference plus noise ratio.

According to an embodiment of the present disclosure, the user equipment selects a part among the N IMRs to determine the interference power. Therefore, for one receiving beam, the user equipment may determine multiple signal to interference plus noise ratios according to different IMR combinations. For example, when receiving the downlink signal with a first receiving beam, the user equipment may select the first IMR and the second IMR among the N IMRs to calculate a signal to interference plus noise ratio, or select the third IMR to calculate another signal to interference plus noise ratio. It is assumed here that N is an integer greater than or equal to 3. Therefore, the signal to interference plus noise ratio information received by the electronic device 100 includes one or more signal to interference plus noise ratios for one receiving beam. It should be noted that although the user equipment calculates one or more signal to interference plus noise ratios for one receiving beam, it is unnecessary for the user equipment to report the receiving beams for which the signal to interference plus noise ratios are directed.

Table 4 shows an example of signal to interference plus noise ratio information received by the electronic device 100.

TABLE 4

|  | IMR identifier | Value of signal to interference plus noise ratio |
|---|---|---|
| First signal to interference plus noise ratio | IMR1 + IMR2 | SINR1 |
| Second signal to interference plus noise ratio | IMR5 | SINR2 |
| ... | ... | ... |
| $P^{th}$ signal to interference plus noise ratio | IME3 + IMR6 | SINRP |

According to an embodiment of the present disclosure, the coordination unit 150 determines a transmitting beam for sending downlink data to another user equipment according to the signal to interference plus noise ratio information from the user equipment. For example, in a case that the signal to interference plus noise ratio information received by the electronic device 100 indicates that the signal to interference plus noise ratio of the user equipment is relatively small on IMR2 and IMR3 (in this case, the electronic device 100 does not know which receiving beam is utilized by the user equipment on IMR2 and IMR3), the electronic device 100 avoids utilizing IMR2 and IMR3 to send downlink data to another user equipment, so as to reduce interference to the user equipment. For another example, in a case that the signal to interference plus noise ratio information received by the electronic device 100 indicates that the signal to interference plus noise ratio of the user equipment is relatively large on IMR1 (in this case, the electronic device 100 does not know which receiving beam is utilized by the user equipment on IMR1), the electronic device 100 utilizes IMR1 to send downlink data to another user equipment as much as possible, having less interference to the user equipment.

In the conventional P3 process, the user equipment fails to report a measurement result in this process, and only determines a suitable receiving beam according to the measurement result. According to the embodiment of the present disclosure, in the P3 process, the electronic device 100 configures N IMRs, and configure, for each of the N IMRs, one or more CMRs corresponding to the IMR. That is, one IMR is mapped to one or more CMRs. The electronic device 100 sends the downlink signal to the user equipment with the same transmitting beam, and the user equipment receives the downlink signal with various receiving beams, so as to determine, for each of the various receiving beams, a signal to interference plus noise ratio between the transmitting beam and the receiving beam. Therefore, the channel quality between the transmitting beam and the receiving beam calculated by the user equipment can reflect interference. Further, the user equipment feeds back the signal to interference plus noise ratio information to the electronic device 100, so that the electronic device 100 can more reasonably select a transmitting beam and the user equipment can more reasonably select a receiving beam.

It can be seen that, according to the embodiment of the present disclosure, the electronic device 100 configures one or more CMRs and one or more IMRs. In addition, according to the embodiments of the present disclosure, configuration of the CMR and IMR in the P2 process is different from the configuration of the CMR and IMR in the P3 process, so that the user equipment determines the signal power according to the signal quality measured on the CMR, and determines the interference power according to the signal quality measured on the IMR, so as to determine the signal to interference plus noise ratio between the transmitting beam and the receiving beam. Therefore, the channel quality between the transmitting beam and the receiving beam calculated by the user equipment can reflect interference. Further, the user equipment feeds back the signal to interference plus noise ratio information to the electronic device 100, so that the electronic device 100 can more reasonably select a transmitting beam and the user equipment can more reasonably select a receiving beam.

2. Configuration Example of User Equipment

Figure 6:
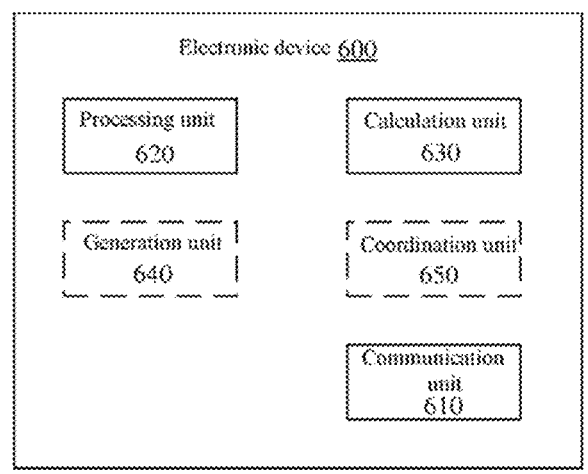
FIG. 6 is a block diagram showing an example of a configuration of an electronic device as user equipment according to an embodiment of the present disclosure.

FIG. 6 is a block diagram showing a structure of an electronic device 600 serving as user equipment in a wireless communication system according to an embodiment of the present disclosure. As shown in FIG. 6, the electronic device 600 includes a communication unit 610, a processing unit 620 and a calculation unit 630.

Here, each unit of the electronic device 600 may be included in processing circuitry. It should be noted that the electronic device 600 may include one processing circuitry or multiple processing circuitry. Further, the processing circuitry may include various discrete functional units to perform various functions and/or operations. It should be noted that these functional units may be physical entities or logical entities, and units with different names may be implemented by the same physical entity.

According to an embodiment of the present disclosure, the electronic device 600 receives, with a receiving beam, a downlink signal of a transmitting beam corresponding to one or more CMRs from a network-side device via the communication unit 610. Here, the network-side device is configured with one or more CMRs and one or more IMRs.

According to an embodiment of the present disclosure, the processing unit 620 controls execution of a beam scanning process. For example, in the P2 process, the processing unit 620 controls the electronic device 600 to receive, with the same receiving beam, a downlink signal of each of multiple transmitting beams from the network-side device. In the P3 process, the processing unit 620 controls the electronic device 600 to receive, with each of the one or more receiving beams, a downlink signal of the same transmitting beam from the network-side device.

According to an embodiment of the present disclosure, the calculation unit 630 calculates a signal to interference plus noise ratio between the transmitting beam of the network-side device and the receiving beam of the electronic device 600. The calculation unit 630 determines signal power according to signal quality measured on the CMR, determines interference power according to signal quality measured on the IMR, and determines the signal to interference plus noise ratio between the transmitting beam and the receiving beam according to the signal power and the interference power.

It can be seen that the electronic device 600 according to the embodiment of the present disclosure receives the downlink signal with the receiving beam, determines the signal power according to the signal quality measured on the CMR, and determines the interference power according to the signal quality measured on the IMR, thereby determining the signal to interference plus noise ratio between the transmitting beam and the receiving beam. Therefore, the calculated channel quality between the transmitting beam and the receiving beam can reflect interference, so that the network-side device can more reasonably select a transmitting beam and the electronic device 600 can more reasonably select a receiving beam.

According to an embodiment of the present disclosure, the processing unit 620 controls the execution of the beam scanning process, so that the electronic device 600 receives, with the same receiving beam, a downlink signal of each of K transmitting beams from the network-side device via the communication unit 610, where K is an integer greater than 1.

Here, the network-side device is configured with K CMRs respectively corresponding to the K transmitting beams, and each CMR is configured with one or more IMRs, which are described in detail in the foregoing, and are not repeated here. As described above, the electronic device 600 adopts such a receiving method in the P2 process.

According to an embodiment of the present disclosure, a CMR and one or more IMRs corresponding to the CMR are in a quasi-co-located CCL type D relationship. Therefore, the electronic device 600 receives, with the same receiving beam, the CMR and one or more IMRs corresponding to the CMR via the communication unit 610.

According to an embodiment of the present disclosure, the calculation unit 630 determines signal power between a transmitting beam and a receiving beam according to signal quality measured on the CMR corresponding to the transmitting beam. For example, for a first transmitting beam corresponding to a first CMR, the calculation unit 630 determines signal power between the first transmitting beam and the receiving beam of the electronic device 600 according to signal quality measured on the first CMR.

According to an embodiment of the present disclosure, the calculation unit 630 determines the interference power between the transmitting beam and the receiving beam according to the signal quality measured on all or part of the IMR corresponding to the CMR. For example, for the first transmitting beam corresponding to the first IMR, the calculation unit 630 determines the interference power between the first transmitting beam and the receiving beam of the electronic device 600 according to the signal quality measured on all or part of the M1 IMRs corresponding to the first CMR. According to an embodiment of the present disclosure, the calculation unit 630 accumulates the signal quality measured on all or part of the M1 IMRs, so as to determine the interference power between the first transmitting beam and the receiving beam of the electronic device 600.

According to an embodiment of the present disclosure, the calculation unit 630 determines a signal to interference plus noise ratio between the transmitting beam and the receiving beam according to the signal power between the transmitting beam and the receiving beam and the interference power between the transmitting beam and the receiving beam. The calculation unit 630 calculates the signal to interference plus noise ratio according to an expression $S/(I+N)$, where S represents the signal power between the transmitting beam and the receiving beam, I represents the interference power between the transmitting beam and the receiving beam, and N represents noise power of a receiver of the electronic device 600. In addition, the signal to interference plus noise ratio in the present disclosure refers to a signal to interference plus noise ratio on a physical layer tor layer 1, L1, Lay1), and therefore is also called L1-SINR (Signal to interference plus Noise Ratio). In the present disclosure, the calculation unit 630 indicates the signal quality with, for example, RSRP or the like, as well as other parameters, which is not limited in the present disclosure.

Similarly, for the second transmitting beam corresponding to the second CMR, the calculation unit 630 determines the signal power between the second transmitting beam acrid the receiving beam of the electronic device 600 according to signal quality measured on the second CMR, determines the interference power between the second transmitting beam and the receiving beam of the electronic device 600 according to the signal quality measured on all or part of the M2 IMRs corresponding to the second CMR, and determines the signal to interference plus noise ratio between the second transmitting beam and the receiving beam of the electronic device 600 according to the measured signal power and interference power. In this way, the calculation unit 630 determines, for each of the K transmitting beams, a signal to interference plus noise ratio between the transmitting beam and the receiving, beam of the electronic device 600.

Here, the signal to interference plus noise ratio is calculated according to a specific CMR, a specific receiving beam, and a specific IMR. For example, for the first CMR, the signal to interference plus noise ratio calculated by the calculation unit 630 indicates that the network-side device sends the downlink signal with the first transmitting beam, the electronic device 600 receives the downlink signal with the same receiving beam, and under the influence of all or part of the M1 IMRs. Alternatively, the transmuting beam is in one-to-one correspondence with the CMR, and therefore the signal to interference plus noise ratio is calculated for a specific transmitting beam, a specific receiving beam, and a specific IMR.

According to an embodiment of the present disclosure, the electronic device 600 acquires, for each CMR, the one or more IMRs corresponding to the CMR through RRC signaling. Further, the calculation unit 630 determines the interference power between the transmitting beam corresponding to the CMR and the receiving beam of the electronic device 600 according to the signal quality measured on all IMRs corresponding to the CMR.

According to an embodiment of the present disclosure, the electronic device 600 acquires, for each CMR, one or more IMRs corresponding to the CMR through RRC signaling, and acquires, for each CMR, one or more activated IMRs among all the IMRs corresponding to the CMR through MAC signaling for example MAC CE or through DCI. Further, the calculation unit 630 determines the interference power between the transmitting beam corresponding to the CMR and the receiving beam of the electronic device 600 according to the signal quality measured on the activated IMR corresponding to the CMR.

According to an embodiment of the present disclosure, the electronic device 600 further includes a generation unit 640 as shown in FIG. 6. The generation unit 640 is configured to generate signal to interference plus noise ratio information. Further, the electronic device 600 sends the signal to interference plus noise ratio information to the network-side device via the communication unit 610.

According to an embodiment of the present disclosure, the signal to interference plus noise ratio information generated by the generation unit 640 includes, for each of one or more among the K transmitting beams, a signal to interference plus noise ratio between the transmitting beam and the receiving beam. Here, the signal to interference plus noise ratio information generated by the generation unit 640 includes one signal to interference plus noise ratio. For example, the signal to interference plus noise ratio information includes only a maximum among the signal to interference plus noise ratios calculated by the calculation unit 630. Alternatively, the signal to interference plus noise ratio information generated by the generation unit 640 includes multiple signal to interference plus noise ratios. For example, the signal to interference plus noise ratio information includes a maximum and a minimum among the signal to interference plus noise ratios calculated by the calculation unit 630.

According to an embodiment of the present disclosure, the signal to interference plus noise ratio information generated by the generation unit 640 further includes, for each signal to interference plus noise ratio, identification information of the CMR to which the signal to interference plus noise ratio is directed. That is, the signal to interference plus noise ratio information is shown in Table 1 above.

In the above embodiment, the calculation unit 630 determines the interference power between the transmitting beam corresponding to the CMR and the receiving beam of the electronic device 600 according to the signal quality measured on all IMRs or activated IMRs corresponding to the CMR, and the network-side device knows all IMRs or activated IMRs corresponding to the CMR. Therefore, the network-side device only acquires the CMR identifier to determine the IMR to which the signal to interference plus noise ratio is directed.

According to an embodiment of the present disclosure, for each CMR, the electronic device 600 acquires one or more IMRs corresponding to the CMR through RRC signaling, and the calculation unit 630 selects one or more IMRs among the IMRs corresponding to the CMR, and determines the interference power according to the signal quality measured on the selected IMR. For example, fir the first transmitting beam corresponding to the first CMR, the calculation unit 630 selects the first IMR and the third IMR from the M1 IMRs corresponding to the first CMR, and determines the interference power between the first transmitting beam and the receiving beam of the electronic device 600 according to the signal quality measured on the first IMR and the third IMR. It is assumed here that M1 is an integer greater than or equal to 3.

According to an embodiment of the present disclosure, the calculation unit 630 calculates multiple signal to interference plus noise ratios for the same transmitting beam. For example, for the first transmitting beam corresponding to the first CMR, the calculation unit 630 selects the first IMR and the third IMR from the M1 IMRs corresponding to the first CMR, and determines the interference power according to the signal quality measured on the first IMR and the third IMR, so as to calculate a signal to interference plus noise ratio between the first transmitting beam and the receiving beam of the electronic device 600. The calculation unit 630 further selects the filth IMR from the M1 IMRs corresponding to the first CMR, and determines the interference power according to the signal quality measured on the fifth IMR, so as to calculate another signal to interference plus noise ratio between the first transmitting beam and the receiving beam of the electronic device 600. It is assumed here that M1 is an integer greater than or equal to 5.

In the above embodiment, the calculation unit 630 determines the interference power between the transmitting beam corresponding to the CMR and the receiving beam of the electronic device 600 according to the signal quality measured on the selected IMR among all IMRs corresponding to the CMR, and the network-side device does not know the IMR selected by the calculation unit 630. Therefore, the signal to interference plus noise ratio information generated by the generation unit 640 further includes, for each signal to interference plus noise ratio, identification information of one or more IMRs to which the signal to interference plus noise ratio is directed. That is, the signal to interference plus noise ratio information is shown in Table 2 above.

According to an embodiment of the present disclosure, the generation unit 640 maps an IMR combination to an index in advance, so that the index indicates one or more IMRs for which the signal to interference plus noise ratio is directed. For example, an index 0 indicates IMR1+IMR2, an index 1 indicates IMR1+IMR3, and so on. In a case that the calculation unit 630 selects IMR1 and IMR2 from the M1 IMRs corresponding to the first CMR to calculate the signal to interference plus noise ratio, the generation unit 640 indicates, with the index 0, that the IMRs for which the signal to interference plus noise ratio is directed are IMR1 and IMR2.

As mentioned above, in the P2 process, the network-side device configures K CMRs respectively corresponding to the K transmitting beams, and configures, for each of the K CMRs, one or more IMRs corresponding to the CMR. That is, one CMR is mapped to one or more IMRs. The network-side device sends, with each of the K transmitting beams, a downlink signal to the electronic device 600. The electronic device 600 receives the downlink signal with the same receiving beam, so as to determine the signal to interference plus noise ratio between the transmitting beam and the receiving beam. Therefore, the channel quality between the transmitting beam and the receiving beam calculated by the electronic device 600 can reflect interference, thereby facilitating reasonable selection of a transmitting beam by the network-side device. For example, the network-side device selects a transmitting beam with a large signal to interference plus noise ratio to send downlink information to the electronic device 600.

According to an embodiment of the present disclosure, the processing unit 620 controls the execution of the beam scanning process, so that the electronic device 600 receives, with each of the one or more receiving beams, the downlink signal of the same transmitting beam from the network-side device via the communication unit 610.

Here, the network-side device is configured with N IMRs each corresponding to one or more CMRs, one or more CMRs correspond to the same transmitting beam, and N is an integer greater than or equal to 1, which are described in detail in the foregoing, and are not repeated here. As described above, the electronic device 600 adopts such a receiving method in the P3 process.

According to an embodiment of the present disclosure, for each receiving beam, the calculation unit 630 determines the signal power between the transmitting beam and the receiving beam according to the signal quality measured on one or more CMRs. Here, the calculation unit 630 determines the signal power according to the signal quality measured on one CMR or multiple CMRs among the one or more CMRs. For example, the calculation unit 630 selects a CMR from the one or more CMRs, and determines the signal power according to the signal quality measured on the CMR. Alternatively, the calculation unit 630 determines the signal power according to an accumulated result of signal quality measured on the multiple CMRs.

According to an embodiment of the present disclosure, for each receiving beam, the calculation unit 630 determines the interference power between the transmitting beam and, the receiving beam according to the signal quality measured on all or part of the N IMRs.

According to an embodiment of the present disclosure, for each receiving beam the calculation unit 630 determines the signal-to-interference plus noise ratio between the transmitting beam and the receiving beam according to the signal power and the interference power. As described above, the calculation unit 630 calculates the signal-to-interference plus noise ratio according to the expression S/(I+N), where S represents the signal power between the transmitting beam and the receiving beam, I represents the interference power between the transmitting beam and the receiving beam, and N represents noise power of a receiver of the electronic device 600.

As described above, the calculation unit 630 calculates, for each receiving beam, the signal to interference plus noise ratio between the transmitting beam and the receiving beam.

According to an embodiment of the present disclosure, the electronic device 600 acquires N IMRs configured by the network-side device through RRC signaling. Further, the calculation unit 630 determines, for each receiving beam, the interference power between the transmitting beam and the receiving beam according to the signal quality measured on all the N IMRs.

According to an embodiment of the present disclosure, the electronic device 600 acquires N IMRs configured by the network-side device through RRC signaling, and acquires one or more activated IMRs among the N IMRs through MAC signaling, for example, MAC CE or through DCI. Further, the calculation unit 630 determines, for each receiving beam, the interference power between the transmitting beam and the receiving beam according to the signal quality measured on the activated IMR.

According to an embodiment of the present disclosure, the signal to interference plus noise ratio information generated by the generation unit 640 includes, for each of one or more receiving beams, the signal to interference plus noise ratio between the transmitting beam and the receiving beam. Here, the signal to interference plus noise ratio information generated by the generation unit 640 includes one signal to interference plus noise ratio. For example, the signal to interference plus noise ratio information includes only a maximum among signal to interference plus noise ratios calculated by the calculation unit 630. Alternatively, the signal to interference plus noise ratio information generated by the generation unit 640 includes multiple signal to interference plus noise ratios. For example, the signal to interference plus noise ratio information includes a maximum and a minimum among signal to interference plus noise ratios calculated by the calculation unit 630. That is, the signal to interference plus noise ratio information is shown in Table 3 above.

In the above embodiment, the calculation unit 630 determines the interference power between the transmitting beam and the receiving beam of the electronic device 600 according, to the signal quality measured on all the IMRs or the activated IMR among the N IMRs, and the network-side device knows the N IMRs or activated IMR. Therefore, the network-side device acquires only the signal to interference plus noise ratio to know the IMR to which the signal to interference plus noise ratio is directed.

According to an embodiment of the present disclosure, the electronic device 600 acquires N IMRs configured by the network-side device through RRC signaling. In addition, for a receiving beam, the calculation unit 630 selects one or more IMRs from the N and determines the interference power between the transmitting beam and the receiving beam according to the signal quality measured on the selected IMR. According to an embodiment of the present disclosure, the calculation unit 630 selects the IMR varying with receiving beam. For example, for the first receiving beam, the calculation unit 630 selects the second and fourth IMRs from the N IMRs to calculate the interference power and the signal to interference plus noise ratio. For the second receiving beam, the calculation unit 630 selects the fifth IMR from the N IMRs to calculate the interference power and the signal to interference plus noise ratio. It is assumed here that N is an integer greater than or equal to 5.

According to an embodiment of the present disclosure, the calculation unit 630 calculates multiple signal to interference plus noise ratios for the same receiving beam. For example, for the first receiving beam, the calculation unit 630 selects the first IMR and the third IMR from the N IMRs, and determines the interference power according to the signal quality measured on the first IMR and the third IMR, to calculate a signal to interference plus noise ratio between the transmitting beam and the first receiving beam of the electronic device 600. The calculation unit 630 also selects the firth IMR from the N IMRs, and determines the interference power according to the signal quality measured on the filth IMR, to calculate another signal to interference plus noise ratio between the transmitting beam and the first receiving beam of the electronic device 600. It is assumed here that N is an integer greater than or equal to 5.

According to an embodiment of the present disclosure, the calculation unit 630 determines the interference power between the transmitting beam and the receiving beam of the electronic device 600 according to the signal quality measured on the selected IMR among the N IMRs, and the network-side device does not know the IMR selected by the calculation unit 630. Therefore, the signal to interference plus noise ratio information generated by the generation unit 640 further includes, for each signal to interference plus noise ratio, identification information of one or more IMRs corresponding to the signal to interference plus noise ratio. That is, the signal to interference plus noise ratio information is shown in Table 4 above.

According to an embodiment of the present disclosure, the generation unit 640 maps an IMR combination to an index in advance, so that the index indicates one or more IMRs for which the signal to interference plus noise ratio is directed. For example, an index 0 indicates IMR1+IMR2, an index 1 indicates IMR1+IMR3, and so on. In a case that the calculation unit 630 selects IMR1 and IMR2 to calculate the signal to interference plus noise ratio, the generation unit 640 indicates, with the index 0, that the IMRs for which the signal to interference plus noise ratio is directed are IMR1 and IMR2.

As mentioned above, in the signal to interference plus noise ratio information, the index indicates the IMR for which the signal to interference plus noise ratio is directed, thereby reducing the signaling overhead.

As described above, in the P3 process, the signal to interference plus noise ratio information reported by the electronic device 600 to the network-side device includes the signal to interference plus noise ratio, and optionally further includes the IMR for which the signal to interference plus noise ratio is directed. In the conventional P3 process, the electronic device 600 reports no measurement information to the network-side device. According to the embodiment of the present disclosure, the electronic device 600 reports the signal to interference plus noise ratio information to the network-side device, so that the network-side device coordinates, according to the reported signal to interference plus noise ratio information, a transmitting beam for sending downlink information to another user equipment. For example, in a case that the signal to interference plus noise ratio information received indicates that the signal to interference plus noise ratio of the electronic device 600 is relatively small on IMR2 and IMR3 (in this case, the network-side device does not know which receiving beam is utilized by the electronic device 600 on IMR2 and IMR3), the network-side device avoids utilizing IMR2 and IMR3 to send downlink data to another user equipment, so as to reduce interference to the electronic device 600. For example, in a case that the signal to interference plus noise ratio information indicates that the signal to interference plus noise ratio of the electronic device 600 is relatively large on IMR1 (in this case, the network-side device does not know which receiving beam is utilized by the electronic device 600 on IMR1), the network-side device utilizes IMR1 to send downlink data to another user equipment as much as possible, having, less interference to the electronic device 600.

According to an embodiment of the present disclosure, the electronic device 600 further includes a coordination unit 650, as shown in FIG. 6. The coordination unit 650 is configured to select a suitable receiving beam according to the measurement result of the P3 process. For example, the coordination unit 650 selects a receiving beam with a relatively large signal to interference plus noise ratio as the receiving beam for receiving downlink information.

As mentioned above, in the P3 process, the network-side device configures N IMRs, and configures, for each of the N IMRs, one or more CMRs corresponding to the IMR. That is, one IMR is mapped to one or more CMRs. The network-side device sends, with the same transmitting beam, a downlink signal to the electronic device 600. The electronic device 600 receives the downlink signal with various receiving beams, to determine, for each of the receiving beams, a signal to interference plus noise ratio between the transmitting beam and the receiving beam. Therefore, the channel quality between the transmitting beam and the receiving beam calculated by the electronic device 600 can reflect interference. Further, the electronic device 600 feeds back the signal to interference plus noise ratio information to the network-side device, so that the network-side device can more reasonably select a transmitting beam and the electronic device 600 can more reasonably select a receiving beam.

Figure 7:
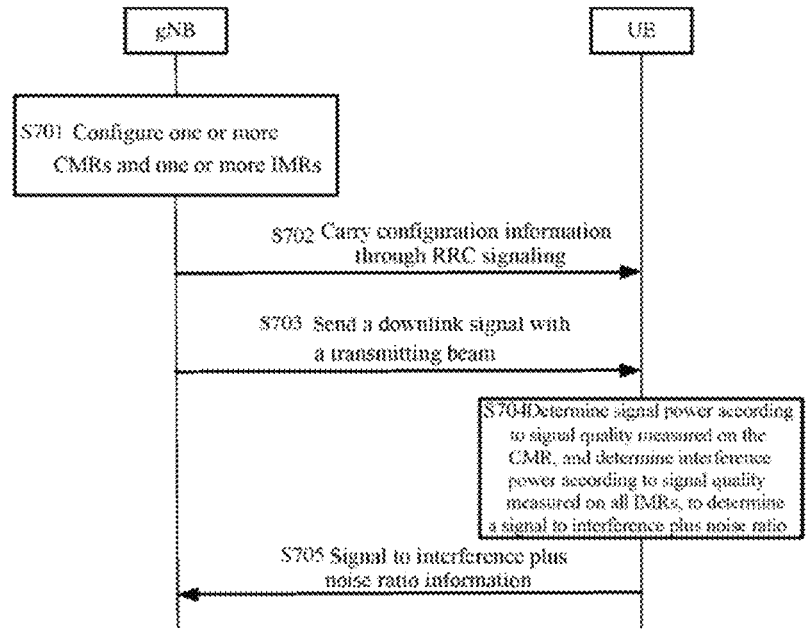
FIG. 7 is a flowchart showing signaling that user equipment reports signal to interference plus noise ratio information to a network-side device according to an embodiment of the present disclosure.
Figure 8:
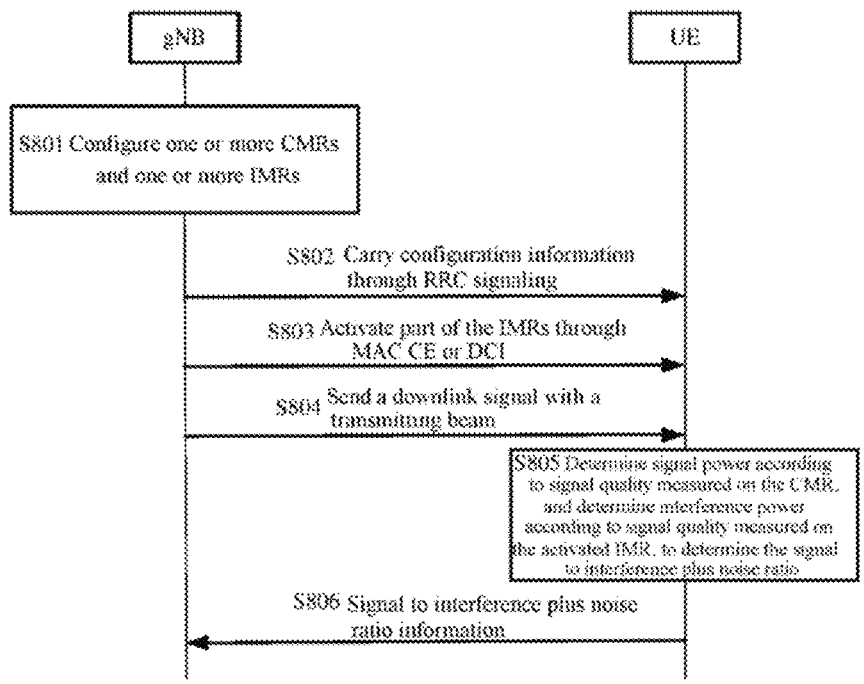
FIG. 8 is a flowchart showing signaling that user equipment reports signal to interference plus noise ratio information to a network-side device according to another embodiment of the present disclosure.
Figure 9:
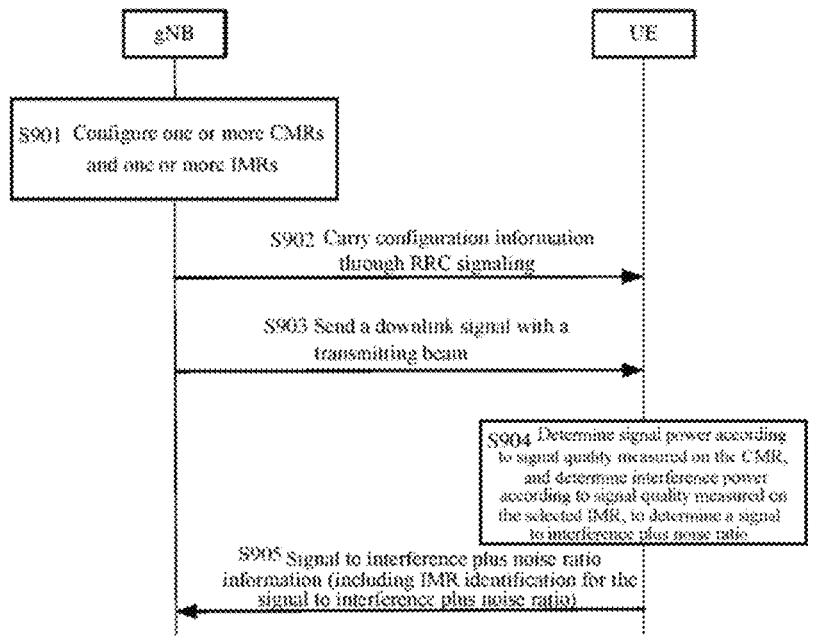
FIG. 9 is a flowchart showing signaling that user equipment reports signal to interference plus noise ratio information to a network-side device according to another embodiment of the present disclosure.

FIGS. 7 to 9 each are a flowchart showing signaling that the user equipment reports signal to interference plus noise ratio information to the network-side device according to an embodiment of the present disclosure. FIGS. 7 to 9 is applicable to the P2 process and the P3 process. Further, the gNB in FIGS. 7 to 9 is implemented by the electronic device 100, and the UE is implemented by the electronic device 600.

As shown in FIG. 7, in step S701, the gNB configures one or more CMRs and one or more IMRs. For example, for the P2 process, the gNB configures multiple CMRs, and configures one or more IMRs for each CMR. For the P3 process, the gNB configures one or more IMRs, and configures one or more CMRs for each IMR. In step S702, the gNB carries configuration information about the CMR and the IMR through RRC signaling. In step S703, the gNB transmits a downlink signal to the UE with a transmitting beam. In step S704, the UE determines signal power according to the signal quality measured on the CMR, and determines the interference power according to the signal quality measured on all the IMRs, so as to determine the signal to interference plus noise ratio. In step S705, the UE sends the signal to interference plus noise ratio information to the gNB. In the embodiment shown in FIG. 7, the UE determines the interference power according to the signal quality measured on all IMRs configured by the gNB.

As shown in FIG. 8, in step S801, the gNB configures one or more CMRs and one or more IMRs. For example, for the P2 process, the gNB configures multiple CMRs, and configures one or more IMRs for each CMR. For the P3 process, the gNB configures one or more IMRs, and configures one or more CMRs for each IMR. In step S802, the gNB carries configuration information about the CMR and the IMR through RRC signaling. In step S803, the gNB activates a part of IMRs through MAC CE or DCI. In step S804, the gNB sends a downlink signal to the UE with a transmitting beam. In step S805, the UE determines signal power according to signal quality measured on the CMR, and determines interference power according to signal quality measured on the activated IMR, so as to determine the signal to interference plus noise ratio. In step S806, the UE sends the signal to interference plus noise ratio information to the gNB. In the embodiment shown in FIG. 8, the UE determines the interference power according to the signal quality measured on the activated IMR configured by the gNB.

As shown in FIG. 9, in step S901, the gNB configures one or more CMRs and one or more IMRs. For example, for the P2 process, the gNB configures multiple CMRs, and configures one or more IMRs for each CMR. For the P3 process, the gNB configures one or more IMRs, and configures one or more CMRs for each IMR. In step S902, the gNB carries configuration information about the CMR and the IMR through RRC signaling. In step S903, the gNB sends a downlink signal to the UE with a transmitting beam. In step S904, the UE determines signal power according to signal quality measured on the CMR, selects one or more IMRs from the configured IMRs, and determines interference power according to the signal quality measured on the selected IMR, so as to determine the signal to interference plus noise ratio. In step S905, the UE sends the signal to interference plus noise ratio information to the gNB, where the signal to interference plus noise ratio information includes an identifier of the IMR for which the signal to interference plus noise ratio is directed. In the embodiment shown in FIG. 9, the UE selects an IMR and determines the interference power according to the signal quality measured on the selected IMR.

According to an embodiment of the present disclosure, the electronic device 100 may serve as a network-side device, and the electronic device 600 may serve as user equipment. That is, the electronic device 100 may provide services for the electronic device 600. Therefore, all the embodiments of the electronic device 100 described in the foregoing are applicable to this.

3. Method Examples

Next, a wireless communication method performed by the electronic device 100 as a network-side device in a wireless communication system according w an embodiment of the present disclosure is described in detail.

Figure 10:
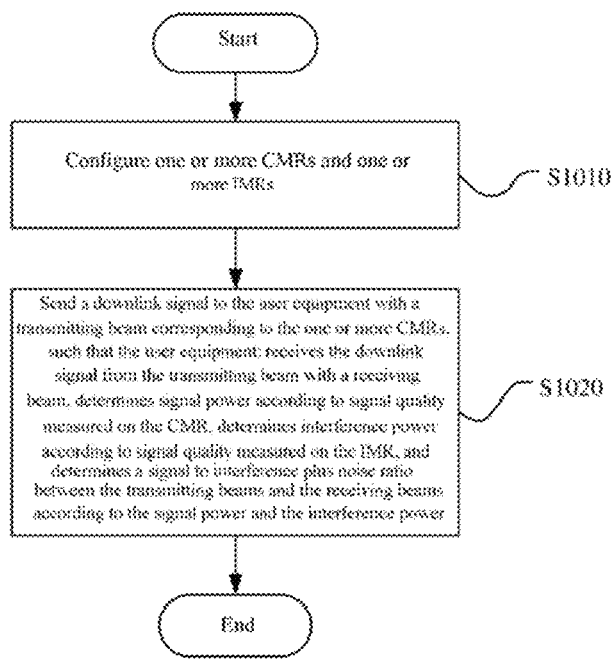
FIG. 10 is a flowchart showing a wireless communication method performed by an electronic device as a network-side device according to an embodiment of the present disclosure.

FIG. 10 is a flowchart showing a wireless communication method performed by the electronic device 100 as a network-side device in a wireless communication system according to an embodiment of the present disclosure.

As shown in FIG. 10, in step S1010, one or more CMRs and one or more IMRs are configured.

In step S1020, a downlink signal is sent to the user equipment with a transmitting beam corresponding to the one or more CMRs, such that the user equipment: receives the downlink signal from the transmitting beam with a receiving beam, determines signal power according to signal quality measured on the CMR, determines interference power according to signal quality measured on the IMR, and determines a signal to interference plus noise ratio between the transmitting beam and the receiving beam according to the signal power and the interference power.

Preferably, the wireless communication method further includes: configuring K CMRs respectively corresponding to K transmitting beams, and configuring, for each of the K CMRs, one or more IMRs corresponding to the CMR, where K is an integer greater than 1; sending a downlink signal to the user equipment with each of the K transmitting beams, such that the user equipment: receives a downlink signal from each transmitting beam with a same receiving beam, determines signal power according to signal quality measured on a CMR corresponding to the transmitting beam, determines interference power according to signal quality measured on all or part of the IMRs corresponding to the CMR, and determines a signal to interference plus noise ratio between the transmitting beam and the receiving beam according to the signal power and the interference power.

Preferably, the wireless communication method further includes: receiving signal to interference plus noise ratio information from the user equipment. The signal to interference plus noise ratio information includes, for each of the one or more of the K transmitting beams, the signal to interference plus noise ratio between the transmitting beam and the receiving beam.

Preferably, the signal to interference plus noise ratio information further includes, for each signal to interference plus noise ratio, identification information of the CMR for which the signal to interference plus noise ratio is directed.

Preferably, the signal to interference plus noise ratio information further includes, for each signal to interference plus noise ratio, identification information of one or more IMRs corresponding to the signal to interference plus noise ratio.

Preferably, the wireless communication method further includes: configuring the CMR and one or more IMRs corresponding to the CMR in a quasi-co-located QCL type D relationship, so that the user equipment receives the CMR and the CMR corresponding to the CMR. One or more IMRs with the same receiving beam.

Preferably, the wireless communication method further includes: configuring, for each CMR, one or more Nits corresponding to the CMR through RRC signaling, so that the user equipment determines the interference power according to the signal quality measured on all IMRs corresponding to the CMR.

Preferably, the wireless communication method further includes: configuring, for each CMR, one or more IMRs corresponding to the CMR through RRC signaling, and activating one or more IMRs among the IMRs corresponding to the CMR through MAC signaling or DCI, so that the user equipment determines the interference power according to the signal quality measured on the activated IMR corresponding to the CMR.

Preferably, the wireless communication method further includes: configuring N IMRs, and configuring, for each of the N IMRs, one or more CMRs corresponding to the IMR, where the one or more CMRs corresponding to the same transmitting beam, and N is an integer greater than or equal to 1; and sending a downlink signal to the user equipment with a transmitting beam to, so that the user equipment: receives the downlink signal with each of the one or more receiving beams, determines the signal power according to the signal quality measured on one or more CMRs, determines the interference power according to the signal quality measured on all or part of the N IMRs, and determines the signal to interference plus noise ratio between the transmitting beam and the receiving beam according to the signal power and the interference power.

Preferably, the wireless communication method further includes: receiving signal to interference plus noise ratio information from the user equipment, where the signal to interference plus noise ratio information includes, for each of one or more receiving beams, the signal to interference plus noise ratio between the transmitting beam and the receiving beam.

Preferably, the signal to interference plus noise ratio information further includes, for each signal to interference plus noise ratio, identification information of one or more IMRs corresponding to the signal to interference plus noise ratio.

Preferably, the wireless communication method further includes: configuring N IMRs through RRC signaling, so that the user equipment determines the interference power according to the signal quality measured on the N IMRs.

Preferably, the wireless communication method further includes: configuring N IMRs through RRC signaling, and activating one or more of the N IMRs through MAC signaling or DCI, so that the user equipment determines the interference power according to the signal quality measured on the activated IMR.

According to an embodiment of the present disclosure, the above method may be performed by the electronic device 100 according to the embodiment of the present disclosure. Therefore, all the foregoing embodiments of the electronic device 100 are: applicable to this.

Next, a wireless communication method performed by the electronic device 600 as user equipment in a wireless communication system according to an embodiment of the present disclosure is described in detail.

Figure 11:
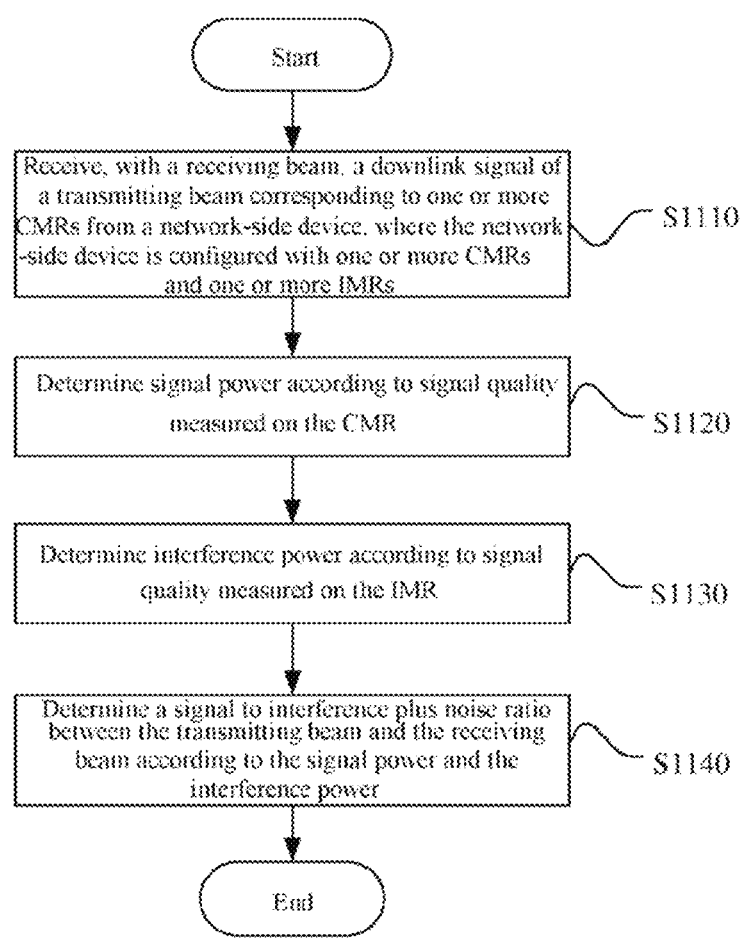
FIG. 11 is a flowchart showing a wireless communication method performed by an electronic device as user equipment according to an embodiment of the present disclosure.

FIG. 11 is a flowchart showing a wireless communication method performed by an electronic device 600 as user equipment in a wireless communication system according to an embodiment of the present disclosure.

As shown in FIG. 11, in step S1110, a downlink signal of a transmitting beam corresponding to one or more CMRs from a network-side device is received with a receiving beam, where the network-side device is configured with one or more CMRs and one or more IMRs.

In step S1120, signal power is determined according to signal quality measured on the CMR.

In step S1130, interference power is determined according to the signal quality measured on the IMR.

In step S1140, a signal to interference plus noise ratio between the transmitting beam and the receiving beam is determined according to the signal power and the interference power.

Preferably, the wireless communication method further includes: receiving the downlink signal of each of the K transmitting beams from the network-side device with the same receiving beam, where K is an integer greater than 1, and the network-side device is configured with K CMRs respectively corresponding to the K transmitting beams, and each CMR is configured with one or more corresponding IMRs; determining the signal power according to the signal quality measured on the CMR corresponding to the transmitting beam; determining the interference power according to the signal quality measured on all or part of the IMRs corresponding to the CMR; and determining the signal to interference plus noise ratio between the transmitting beam corresponding to the CMR and the receiving beam according to the signal power and the interference power.

Preferably, the wireless communication method further includes: sending signal to interference plus noise ratio information to the network-side device, where the signal-to-interference plus noise ratio information includes, for each of the one or more of the K transmitting beams, the signal to interference plus noise ratio between the transmitting beam and the receiving beam.

Preferably, the signal to interference plus noise ratio information further includes, for each signal to interference plus noise ratio, identification information of the CMR for which the signal-to-interference plus noise ratio is directed.

Preferably, the signal to interference plus noise ratio information further includes, for each signal to interference plus noise ratio, identification information of one or more IMRs corresponding to the signal to interference plus noise ratio.

Preferably, the CMR and one or more IMRs corresponding to the CMR are in a quasi-co-located QCL type D relationship. The wireless communication method further includes: receiving the CMR and one or more IMRs corresponding to the CMR with the same receiving beam.

Preferably, the wireless communication method further includes: acquiring, for each CMR, one or more IMRs corresponding to the CMR through RRC signaling; and determining the interference power according to the signal quality measured on all IMRs corresponding to the CMR.

Preferably, the wireless communication method further includes: acquiring, for each CMR, one or more IMRs corresponding the CMR through RRC signaling; acquiring one or more activated IMRs among the IMRs corresponding to the CMR through MAC signaling or DCI; and determining the interference power according to the signal quality measured on the activated IMR corresponding to the CMR.

Preferably, the wireless communication method further includes: selecting, for each CMR, one or more IMRs from the IMRs corresponding to the each CMR; and determining the interference power according to the signal quality measured on the selected IMR.

Preferably, the wireless communication method further includes: receiving the downlink signal of the same transmitting beam from the network-side device with each of the one or more receiving beams, where the network-side device is configured with N IMRs, each of the N IMRs is configured with one or more CMRs, the one or more CMRs correspond to the same transmitting beam, and N is an integer greater than or equal to 1; determining the signal power according to the signal quality measured on the one or more CMRs; determining the interference power according to the signal quality measured on all or part of the N and determining the signal to interference plus noise ratio between the transmitting beam and the receiving beam according to the signal power and the interference power.

Preferably, the wireless communication method further includes: sending signal to interference plus noise ratio information to the network-side device, where the signal to interference plus noise ratio information includes, for each of one or more receiving beams, the signal to interference plus noise ratio between the transmitting beam and the receiving beam.

Preferably, the signal to interference plus noise ratio information further includes, for each signal to interference plus noise ratio, identification information of one or more IMRs corresponding to the signal to interference plus noise ratio.

Preferably, the wireless communication method further includes: acquiring N IMRs through RRC signaling; and determining the interference power according to the signal quality measured on the N IMRs.

Preferably, the wireless communication method further includes: acquiring N IMRs through RRC signaling; acquiring one or more activated IMRs among the N IMRs through MAC signaling or DCI; and determining the interference power according to the signal quality measured on the activated IMR.

Preferably, the wireless communication method further includes: selecting one or more IMRs from the N IMRs; and determining the interference power according to the signal quality measured on the selected IMR.

According to the embodiment of the present disclosure, the above-mentioned method may be performed by the electronic device 600 according to the embodiment of the present disclosure. Therefore, all the foregoing embodiments of the electronic device 600 are applicable to this.

4. Application Example

The technology according, to the present disclosure is applicable to various products.

For example, the network-side device may be implemented as any type of TRP. The TRP may have sending and receiving functions. For example, the TRP may receive information from user equipment and a base station device, and send information to user equipment and the base station device. In a typical example, the TRP provides services to user equipment and is controlled by the base station device. Further, the TRP may have a structure similar to that of the base station device described below, or may only have a structure related to the transmission and reception of information in the base station device.

The network-side device may be implemented as any type of base station device, such as a macro eNB and a small eNB, and may also be implemented as any type of gNB for example, a base station in 5G system). A small eNB may be an eNB that covers a cell smaller than a macro cell, such as a pico eNB, a micro eNB, and a home (femto) eNB. Instead, the base station may be implemented as any other type of base station, such as a NodeB and a base transceiver station (BTS). The base station may include: a maw body (also referred to as a base station device) configured to control wireless communication; and one or more remote radio heads (RRH) arranged in a different place from the main body.

The user equipment may be implemented as a mobile terminal (such as a smart phone, a tablet personal computer (PC), a notebook PC, a portable game terminal, a portable/dongle mobile router, and a digital camera) or a vehicle-mounted terminal (such as a vehicle navigation device). The user equipment may also be implemented as a terminal (also referred to as a machine type communication (MTC) terminal) that performs machine-to-machine (M2M) communication. In addition, the user equipment may be a wireless communication module (such as an integrated circuit module including, a single chip) installed on each of the above-mentioned user equipment.

Application Examples of Base Stations

First Application Example

Figure 12:
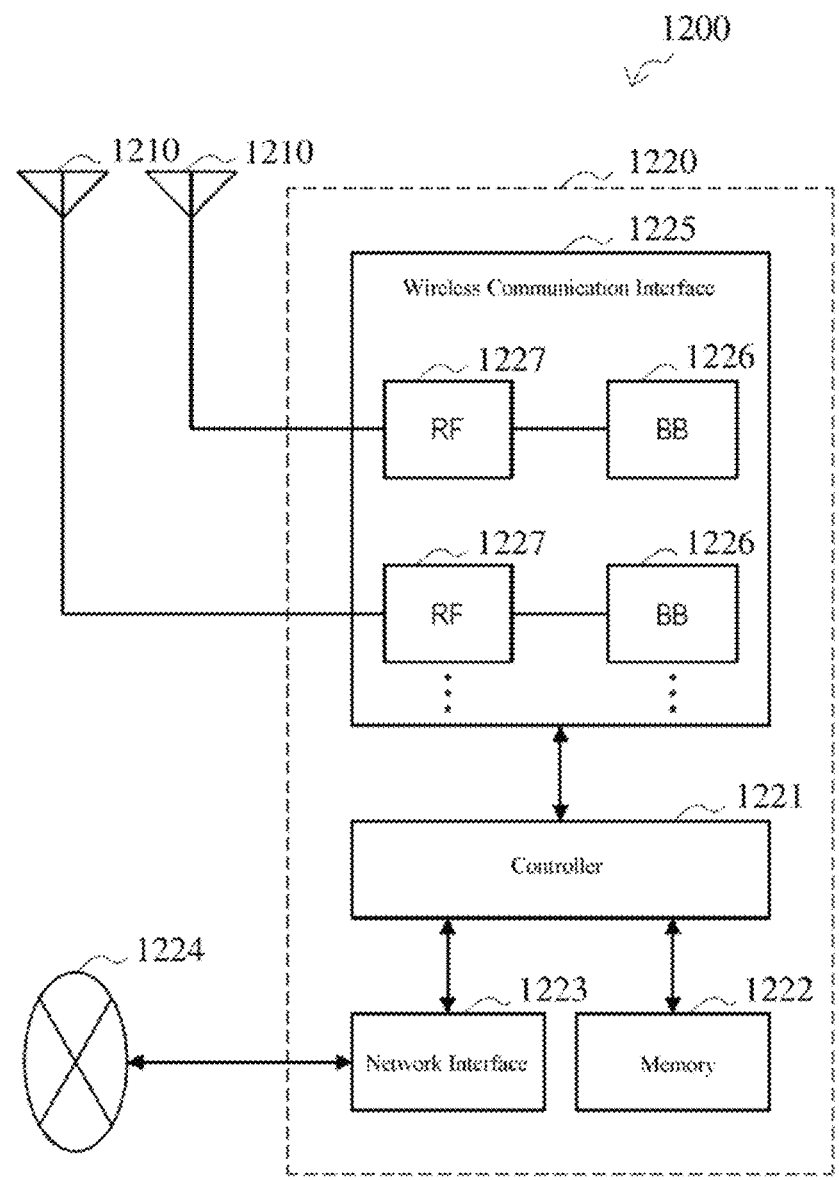
FIG. 12 is a block diagram showing a first example of a schematic configuration of an eNB (evolved node B)

FIG. 12 is a block diagram showing a first example of a schematic configuration of an eNB to which the technology according to the present disclosure may be applied. The eNB 1200 includes one or more antennas 1210 and a base station device 1220. Each of the one or more antennas 1210 is connected to the base station device 1220 via an RF cable.

Each of the one or more antennas 1210 includes a single or multiple antenna elements (such as multiple antenna elements included in a multiple-input multiple-output (MIMO) antenna), and is used for the base station device 1220 to transmit and receive wireless signals. As shown in FIG. 12, the eNB 1200 may include multiple antennas 1210. For example, the multiple antennas 1210 may be compatible with multiple frequency bands used by the eNB 1200. Although FIG. 12 shows an example in which the eNB 1200 includes multiple antennas 1210, the eNB 1200 may include a single antenna 1210.

The base station device 1220 includes a controller 1221, a memory 1222, a network interface 1223, and a wireless communication interface 1225.

The controller 1221 may be, for example, a CPU or a DSP, and operates various functions of higher layers of the base station device 1220. For example, the controller 1221 gene rates a data packet based on the data in the signal processed by the wireless communication interface 1225, and transmits the generated packet via the network interface 1223. The controller 1221 may bundle data from multiple baseband processors to generate a bundled packet, and transfer the generated bundled packet. The controller 1221 may have a logic function for performing control such as radio resource control, radio bearer control, mobility management, admission control, and scheduling. This control may be performed in conjunction with nearby eNBs or core network nodes. The memory 1222 includes a RAM and a ROM, and stores programs executed by the controller 1221 and various types of control data (such as a terminal list, transmission power data, and scheduling data).

The network interface 1223 is a communication interface for connecting the base station device 1220 to a core network 1224. The controller 1221 may communicate with a core network node or another eNB via a network interface 1223. In this case, the eNB 1200 and the core network node or other eNBs may be connected to each other through a logical interface (such as an S1 interface and an X2 interface). The network interface 1223 may also be a wired communication interface or a wireless communication interface for a wireless backhaul line. In a case that the network interface 1223 is a wireless communication interface, the network interface 1223 uses a higher frequency band for wireless communication than the frequency band used by the wireless communication interface 1225.

The wireless communication interface 1225 supports any cellular communication scheme such as long-term evolution (LTE) and LTE-Advanced, and provides wireless connection to a terminal located in the cell of the eNB 1200 via the antenna 1210. The wireless communication interface 1225 may generally include, for example, a baseband (BB) processor 1226 and RF circuitry 1227. The BB processor 1226 performs, for example, encoding/decoding, modulation/demodulation, and multiplexing/demultiplexing, and performs various types of signal processing of layers (such as L1, medium access control (MAC), radio link control (RLC), and packet data convergence protocol (PDCP)). Instead of the controller 1221, the BB processor 1226 may have part or all of the above-mentioned logical functions. The BB processor 1226 may be a memory storing a communication control program, or a module including a processor and related circuits configured to execute the program. Updating program may change the function of the BB processor 1226. The module may be a card or a blade inserted into a slot of the base station device 1220. Alternatively, the module is a chip mounted on a card or blade. Further, the RF circuitry 1227 may include, for example, a mixer, a filter, and an amplifier, and transmit and receive wireless signals via the antenna 1210.

As shown in FIG. 12, the wireless communication interface 1225 may include multiple BB processors 1226. For example, the multiple BB processors 1226 may be compatible with multiple frequency bands used by the eNB 1200. As shown in FIG. 12, the wireless communication interface 1225 may include a multiple RF circuitry 1227. For example, the multiple RF circuitry 1227 may be compatible with multiple antenna elements. Although FIG. 12 shows an example in which the wireless communication interface 1225 includes multiple BB processors 1226 and multiple RF circuitry 1227, the wireless communication interface 1225 may include a simile BB processor 1226 or a single RF circuitry 1227.

Second Application Example

Figure 13:
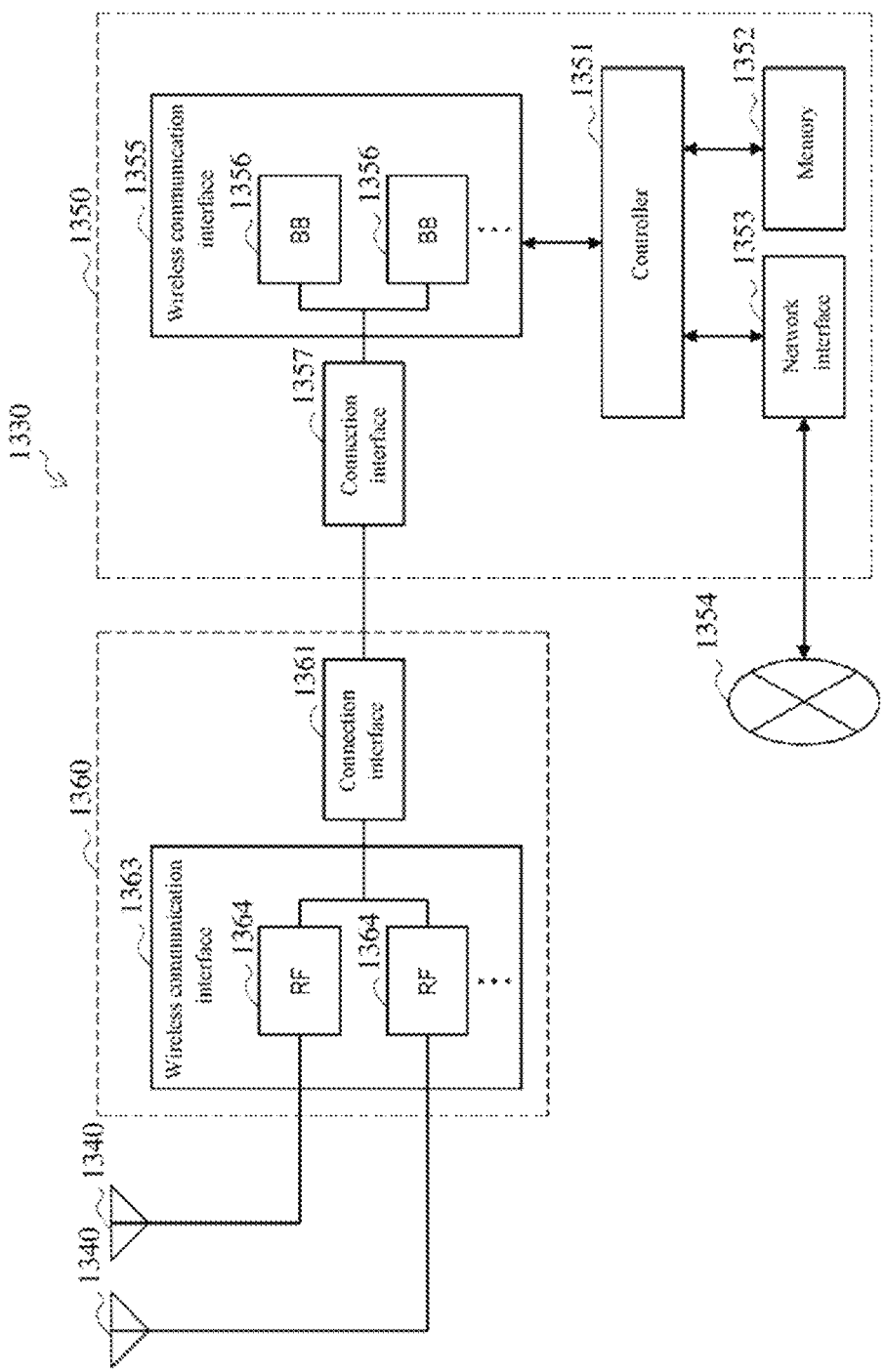
FIG. 13 is a block diagram showing a second example of the schematic configuration of the eNB.

FIG. 13 is a block diagram showing a second example of a schematic configuration of an eNB to which the technology according to the present disclosure may be applied. The eNB 1330 includes one or more antennas 1340, a base station device 1350, and an RRH 1360. Each of the one or more antennas 1340 is connected to the RRH 1360 via an RF cable. The base station device 1350 may be connected to the RRH 1360 via a high-speed line such as an optical fiber cable.

Each of the one or more antennas 1340 includes a single or multiple antenna elements (such as multiple antenna elements included in a MIMO antenna) and is used for the RRH 1360 to transmit and receive wireless signals. As shown in FIG. 13, the eNB 1330 may include multiple antennas 1340. For example, the multiple antennas 1340 may be compatible with multiple frequency bands used by the eNB 1330. Although FIG. 13 shows an example in which the eNB 1330 includes multiple antennas 1340, the eNB 1330 may include a single antenna 1340.

The base station device 1350 includes a controller 1351, a memory 1352, a network interface 1353, a wireless communication interface 1355, and a connection interface 1357. The controller 1351, the memory 1352, and the network interface 1353 are the same as the controller 1221, the memory 1222, and the network interface 1223 described with reference to FIG. 12, respectively.

The wireless communication interface 1355 supports any cellular communication scheme such as LTE and LTE-Advanced, and provides wireless communication to a terminal located in a sector corresponding to the RRH 1360 via the RRH 1360 and the antenna 1340. The wireless communication interface 1355 may generally include a BB processor 1356, for example. The BB processor 1356 is the same as the BB processor 1226 described with reference to FIG. 12 except that the BB processor 1356 is connected to the RF circuitry 1364 of the RRH 1360 via the connection interface 1357. As shown in FIG. 13, the wireless communication interface 1355 may include multiple BB processors 1356. For example, the multiple BB processors 1356 may be compatible with multiple frequency bands used by the eNB 1330. Although FIG. 13 shows an example in which the wireless communication interface 1355 includes multiple BB processors 1356, the wireless communication interface 1355 may include a single BB processor 1356.

The connection interface 1357 is an interface for connecting the base station device 1350 (wireless communication interface 1355) to the RRH 1360. Alternatively, the connection interface 1357 is a communication module for connecting the base station device 1350 (wireless communication interface 1355) to the communication in the above-mentioned high-speed line of the RRH 1360.

The RRH 1360 includes a connection interface 1361 and a wireless communication interface 1363.

The connection interface 1361 is an interface for connecting the RRH 1360 (wireless communication interface 1363) to the base station device 1350. Alternatively, the connection interface 1361 is a communication module used for communication in the above-mentioned high-speed line.

The wireless communication interface 1363 transmits and receives wireless signals via the antenna 1340. The wireless communication interface 1363 may generally include, for example, RF circuitry 1364. The RF circuitry 1364 may include, for example, a mixer, a filter, and an amplifier, and transmit and receive wireless signals via the antenna 1340. As shown in FIG. 13, the wireless communication interface 1363 may include multiple RF circuitry 1364. For example, the multiple RF circuitry 1364 may support multiple antenna elements. Although FIG. 13 shows an example in which the wireless communication interface 1363 includes multiple RF circuitry 1364, the wireless communication interface 1363 may include a single RF circuitry 1364.

In the eNB 1200 shown in FIG. 12 and the eNB 1330 shown in FIG. 13, the configuration unit 110, the processing unit 120, the determination unit 140, and the coordination unit 150 described in FIG. 1 may be implemented by the controller 1221 and/or the controller 1351. At least part of the functions may be implemented by the controller 1221 and the controller 1351. For example, the controller 1221 and/or the controller 1351 may execute instructions stored in the corresponding memory to configure the CMR and the IMR, perform beam scanning in the P2 process or the P3 process, determine the signal to interference plus noise ratio for the transmitting beam (and the IMR optionally), and determine the transmitting beam for sending downlink data to the user equipment and the transmitting beam for sending downlink data to another user equipment according to the signal to interference plus noise ratio information received from the user equipment.

Application Examples of Terminal Device

First Application Example

Figure 14:
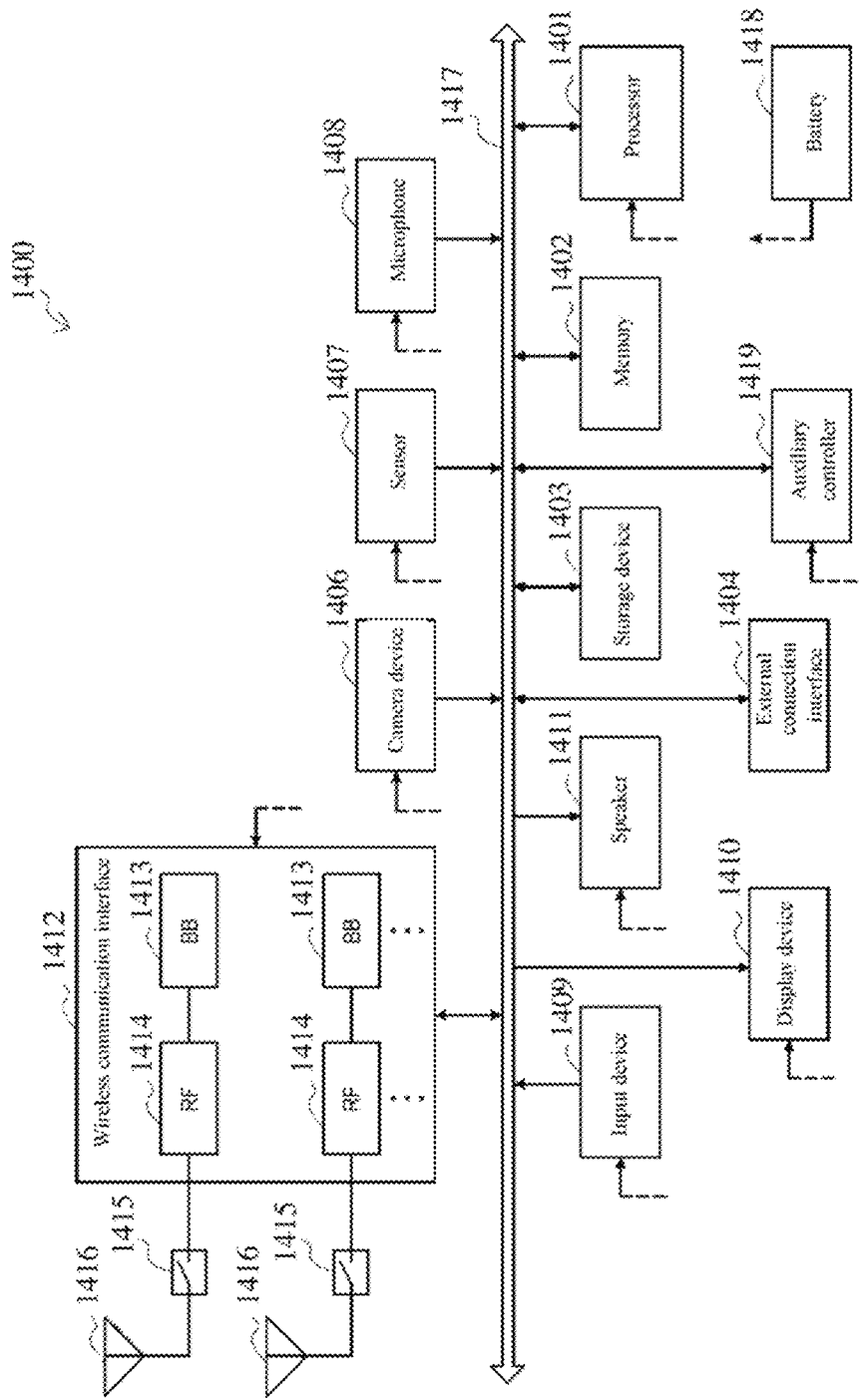
FIG. 14 is a block diagram showing an example of a schematic configuration of a smart phone.

FIG. 14 is a block diagram showing an example of a schematic configuration of a smart phone 1400 to which the technology according to the present disclosure may be applied. The smart phone 1400 includes a processor 1401, a memory 1402, a storage device 1403, an external connection interface 1404, a camera device 1406, a sensor 1407, a microphone 1408, an input device 1409, a display device 1410, a speaker 1411, a wireless communication interface 1412, one or more antenna switches 1415, one or more antennas 1416, a bus 1417, a battery 1418, and an auxiliary controller 1419.

The processor 1401 may be, for example, a CPU or a system on a chip (SoC), and controls the functions of the application layer and another layer of the smart phone 1400. The memory 1402 includes a RAM and a ROM, and stores data and programs executed by the processor 1401. The storage device 1403 may include a storage medium such as a semiconductor memory and a hard disk. The external connection interface 1404 is an interface for connecting an external device such as a memory card and a universal serial bus (USB) device to the smartphone 1400.

The camera device 1406 includes an image sensor (such as a charge coupled device (CCD) and a complementary metal oxide semiconductor (CMOS)), and generates a captured image. The sensor 1407 may include a group of sensors, such as a measurement sensor, a gyroscope sensor, a geomagnetic sensor, and an acceleration sensor. The microphone 1408 converts the sound inputted to the smart phone 1400 into an audio signal. The input device 1409 includes, for example, a touch sensor configured to detect a touch on the screen of the display device 1410, a keypad, a keyboard, a button, or a switch, and receives an operation or information inputted from the user. The display device 1410 includes a screen (such as a liquid crystal display (LCD) and an organic light emitting diode (OLED) display), and displays an output image of the smart phone 1400. The speaker 1411 converts the audio signal outputted from the smart phone 1400 into sound.

The wireless communication interface 1412 supports any cellular communication scheme (such as LTE and LTE-Advanced), and performs wireless communication. The wireless communication interface 1412 may generally include, for example, a BB processor 1413 and RF circuitry 1414. The BB processor 1413 may perform, for example, encoding/decoding, modulation/demodulation, and multiplexing/demultiplexing, and perform various types of signal processing for wireless communication. Further, the RF circuitry 1414 may include, for example, a mixer, a filter, and an amplifier, and transmit and receive wireless signals via the antenna 1416. The wireless communication interface 1412 may be a chip module on which the BB processor 1413 and the RF circuitry 1414 are integrated. As shown in FIG. 14, the wireless communication interface 1412 may include multiple BB processors 1413 and multiple RF circuitry 1414. Although FIG. 14 shows an example in which the wireless communication interface 1412 includes multiple BB processors 1413 and multiple RF circuitry 1414, the wireless communication interface 1412 may include a single BB processor 1413 or a single RF circuit 1414.

In addition to the cellular communication scheme, the wireless communication interface 1412 may support another type of wireless communication scheme, such as a short-range wireless communication scheme, a near field communication scheme, and a wireless local area network (LAN) scheme. In this case, the wireless communication interface 1412 may include a BB processor 1413 and RF circuitry 1414 for each wireless communication scheme.

Each of the antenna switches 1415 switches a connection destination of the antenna 1416 among multiple circuitry included in the wireless communication interface 1412 (for example, circuitry for different wireless communication schemes).

Each of the antennas 1416 includes a single or multiple antenna elements (such as multiple antenna elements included in a MIMO antenna), and is used for the wireless communication interface 1412 to transmit and receive wireless signals. As shown in FIG. 14, the smart phone 1400 includes multiple antennas 1416. Although FIG. 14 shows an example in which the smart phone 1400 includes multiple antennas 1416, the smart phone 1400 may include a single antenna 1416.

In addition, the smart phone 1400 may include an antenna 1416 for each wireless communication scheme. In this case, the antenna switch 1415 may be omitted from the configuration of the smart phone 1400.

The bus 1417 connects the processor 1401, the memory 1402, the storage device 1403, the external connection interface 1404, the camera device 1406, the sensor 1407, the microphone 1408, the input device 1409, the display device 1410, the speaker 1411, the wireless communication interface 1412, and the auxiliary controller 1419 to each other. The battery 1418 supplies power to each block of the smart phone 1400 shown in FIG. 14 via a feeder line, and the feeder line is partially shown as a dashed line in the drawings. The auxiliary controller 1419 operates the minimum necessary functions of the smart phone 1400 in the sleep mode, for example.

In the smart phone 1400 shown in FIG. 14, the processing unit 620, the calculation unit 630, the generation unit 640, and the coordination unit 650 shown in FIG. 6 may be implemented by the processor 1401 or the auxiliary controller 1419. At least a part of the function may be implemented by the processor 1401 or the auxiliary controller 1419. For example, the processor 1401 or the auxiliary controller 1419 executes instructions stored in the memory 1402 or the storage device 1403 to perform beam scanning according in the P2 process or the P3 process, calculate the signal to interference plus noise ratio between the transmitting beam and the receiving beam, generate the signal to interference plus noise ratio information, and determine a receiving beam for receiving downlink information according to the signal to interference plus noise ratio.

Second Application Example

Figure 15:
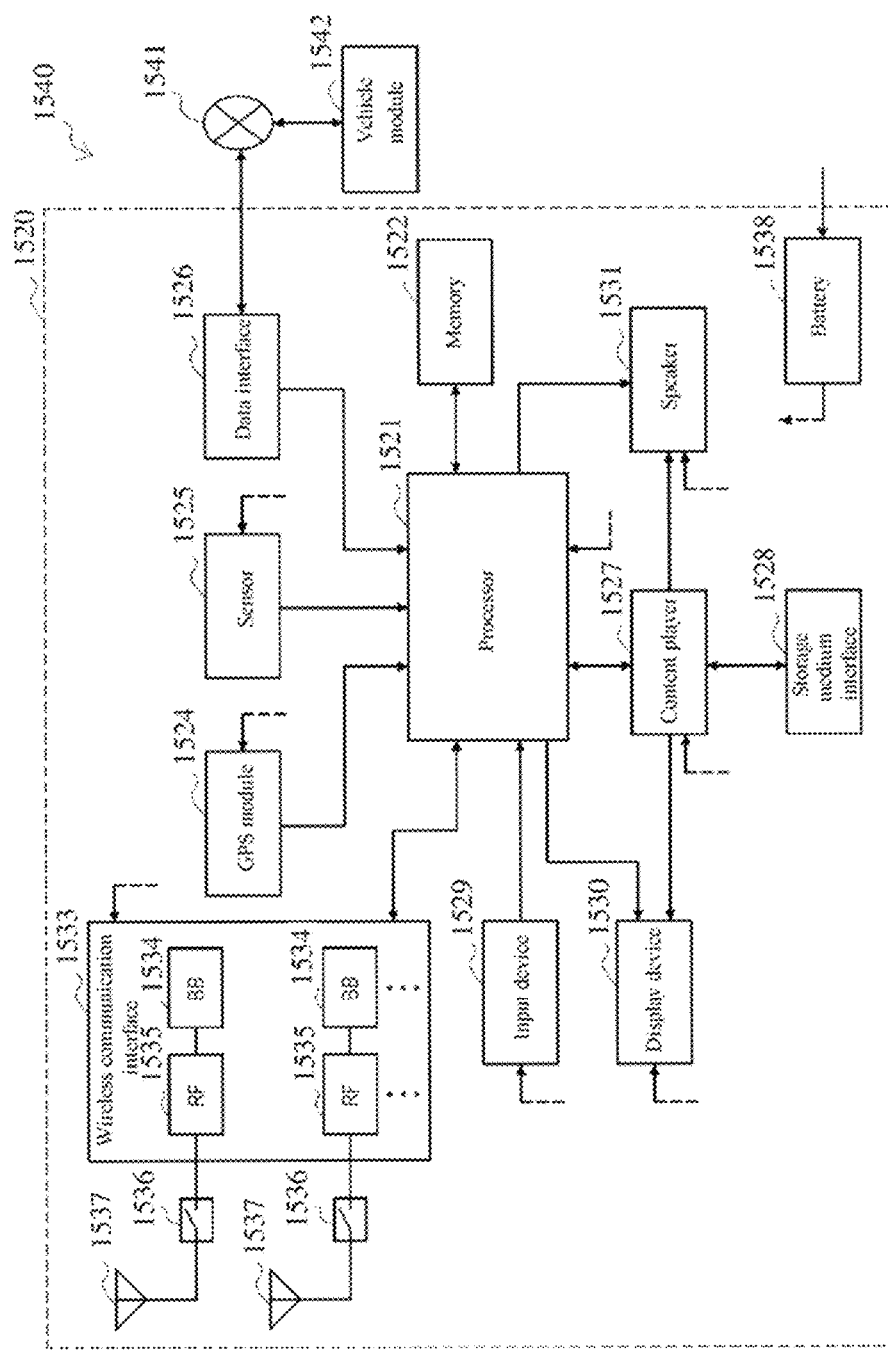
FIG. 15 is a block diagram showing an example of a schematic configuration of a vehicle navigation device.

FIG. 15 is a block diagram showing an example of a schematic configuration of a vehicle navigation device 1520 to which the technology according to the present disclosure may be applied. The vehicle navigation device 1520 includes a processor 1521, a memory 1522, a global positioning system (UPS) module 1524, a sensor 1525, a data interface 1526, a content player 1527, a storage medium interface 1528, an input device 1529, a display device 1530, a speaker 1531, a wireless communication interface 1533, one or more antenna switches 1536, one or more antennas 1537, and a battery 1538.

The processor 1521 may be, for example, a CPU or SoC, and controls the navigation function and other functions of the vehicle navigation device 1520. The memory 1522 includes a RAM and a ROM, and stores data and programs executed by the processor 1521.

The GPS module 1524 measures the position (such as latitude, longitude, and altitude) of the vehicle navigation device 1520 based on GPS signals received from GPS satellites. The sensor 1525 may include a group of sensors, such as a gyroscope sensor, a geomagnetic sensor, and an air pressure sensor. The data interface 1526 is connected to, for example, an in-vehicle network 1541 via a terminal not shown, and acquires data (such as vehicle speed data) generated by the vehicle.

The content player 1527 reproduces content stored in a storage medium (such as a CD and a DVD), which is inserted into the storage medium interface 1528. The input device 1529 includes, for example, a touch sensor configured to detect a touch on the screen of the display device 1530, a button, or a switch, and receives an operation or information inputted from the user. The display device 1530 includes a screen such as an LCD or OLED display, and displays an image of a navigation function or reproduced content. The speaker 1531 outputs the sound of the navigation function or the reproduced content.

The wireless communication interface 1533 supports any cellular communication scheme such as LTE and LTE-Advanced, and performs wireless communication. The wireless communication interface 1533 may generally include, for example, a BB processor 1534 and RF circuitry 1535. The BB processor 1534 may perform, for example, encoding/decoding, modulation/demodulation, and multiplexing/demultiplexing, and perform various types of signal processing for wireless communication. Further, the RF circuitry 1535 may include, for example, a mixer, a filter, and an amplifier and transmit and receive wireless signals via the antenna 1537. The wireless communication interface 1533 may be a chip module on which the BB processor 1534 and the RF circuitry 1535 are integrated. As shown in FIG. 15, the wireless communication interface 1533 includes multiple BB processors 1534 and multiple RF circuitry 1535. Although FIG. 15 shows an example in which the wireless communication interface 1533 includes multiple BB processors 1534 and multiple RF circuitry 1535, the wireless communication interface 1533 may include a single BB processor 1534 or a single RF circuit 1535.

In addition to the cellular communication scheme, the wireless communication interface 1533 may support another type of wireless communication scheme, such as a short-range wireless communication scheme, a near field communication scheme, and a wireless LAN scheme. In this case, the wireless communication interface 1533 may include a 1313 processor 1534 and RF circuitry 1535 for each wireless communication scheme.

Each of the antenna switches 1536 switches a connection destination of the antenna 1537 among multiple circuitry included in the wireless communication interface 1533 (for example, circuitry for different wireless communication schemes).

Each of the antennas 1537 includes a single or multiple antenna elements such as multiple antenna elements included in a MIMO antenna), and is used for the wireless communication interface 1533 to transmit and receive wireless signals. As shown in FIG. 15, the vehicle navigation device 1520 includes multiple antennas 1537. Although FIG. 15 shows an example in which the vehicle navigation device 1520 includes multiple antennas 1537, the vehicle navigation device 1520 may include a single antenna 1537.

In addition, the vehicle navigation device 1520 may include an antenna 1537 for each wireless communication scheme. In this case, the antenna switch 1536 may be omitted from the configuration of the vehicle navigation device 1520.

The battery 1538 supplies power to each block of the vehicle navigation device 1520 shown in FIG. 15 via a feeder line, and the feeder line is partially shown as a dashed line in the drawings. The battery 1538 accumulates electric power supplied from the vehicle.

In the vehicle navigation device 1520 shown in FIG. 15, the processing unit 620, the calculation unit 630, the generation unit 640, and the coordination unit 650 shown in FIG. 6 may be implemented by the processor 1521. At least part of the functions may be implemented by the processor 1521. For example, the processor 1521 executes instructions stored in the memory 1522 to perform beam scanning according in the P2 process or the P3 process, calculate the signal to interference plus noise ratio between the transmitting beam and the receiving beam, generate the signal to interference plus noise ratio information, and determine a receiving beam for receiving downlink information according to the signal to interference plus noise ratio.

The technology according to the present disclosure may also be implemented as an in-vehicle system (or vehicle) 1540 including one or more blocks of a vehicle navigation device 1520, an in-vehicle network 1541, and a vehicle module 1542. The vehicle module 1542 generates vehicle data (such as vehicle speed, engine speed, and failure information), and outputs the generated data to the in-vehicle network 1541.

The preferred embodiments of the present disclosure have been described above with reference to the accompanying drawings, and the present disclosure is not limited to the above examples. Those skilled in the art may make various changes and modifications within the scope of the appended claims, and it should be understood that these changes and modifications should fall within the technical scope of the present disclosure.

For example, the units shown in dashed boxes in the functional block diagrams shown in the accompanying drawings all indicate that the functional units are optional in the device, and the various optional functional units may be combined in an appropriate manner to achieve functions as needed.

For example, multiple functions included in one unit in the above embodiments may be implemented by separate devices. Alternatively, the multiple functions implemented by multiple units in the above embodiments may be implemented by separate devices, respectively. In addition, one of the above functions may be implemented by multiple units. Needless to say, such a configuration is included in the technical scope of the present disclosure.

In this specification, the steps described in the flowchart include not only processing performed in time series in the described order, but also processing performed in parallel or individually rather than necessarily in time series. In addition, even in the steps processed in time series, the order may be changed appropriately.

Although the embodiments of the present disclosure have been described in detail with reference to the accompanying drawings, it should be understood that the above-described embodiments are only used to illustrate the present disclosure, and do not constitute a limitation to the present disclosure. For those skilled in the art, various modifications and changes may be made to the foregoing embodiments without departing from the essence and scope of the present disclosure. Therefore, the scope of the present disclosure is limited only by the appended claims and their equivalents.

The invention claimed is:

1. An electronic device, comprising processing circuitry, configured to:
    configure K channel measurement resources (CMRs) in one-to-one correspondence to K transmitting beams, and configure, for each of the K CMRs, one or more interference measurement resources (IMRs) corresponding to the CMR, wherein K is an integer greater than 1; and
    send a downlink signal to a user equipment with each transmitting beam among the K transmitting beams, such that the user equipment:
    receives a downlink signal from each transmitting beam with a same receiving beam,
    determines signal power according to signal quality measured on a CMR corresponding to the transmitting beam,
    determines interference power according to signal quality measured on all or part of the IMRs corresponding to the CMR, and
    determines a signal to interference plus noise ratio between the transmitting beam and the receiving beam according to the signal power and the interference power.

2. The electronic device according to claim 1, wherein the processing circuitry is further configured to:
    receive, from the user equipment, signal to interference plus noise ratio information comprising signal to interference plus noise ratios between one or more transmitting beams among the K transmitting beams and the receiving beam.

3. The electronic device according to claim 1, wherein the processing circuitry is further configured to:
    configure the CMR and the one or more IMRs corresponding to the CMR to be in a Quasi-co-located (QCL) type D relationship, such that the user equipment receives the CMR and the one or more IMRs corresponding to the CMR with a same receiving beam.

4. The electronic device according to claim 1, wherein the processing circuitry is further configured to:
    configure one or more IMRs for each CMR through radio resource control (RRC) signaling, such that the user equipment determines interference power according to signal quality measured on all the IMRs corresponding to the CMR.

5. The electronic device according to claim 1, wherein the processing circuitry is further configured to:
    configure one or more IMRs for each CMR through radio resource control (RRC) signaling, activate one or more IMRs among the IMRs corresponding to the CMR through medium access control (MAC) signaling or downlink control information (DCI), such that the user equipment determines interference power according to signal quality measured on the activated IMR corresponding to the CMR.

6. An electronic device, comprising processing circuitry, configured to:
    configure one or more channel measurement resources (CMRs) and one or more interference measurement resources (IMRs); and
    send a downlink signal to user equipment with a transmitting beam corresponding to the one or more CMRs, such that the user equipment:
    receives the downlink signal from the transmitting beam with a receiving beam,
    determines signal power according to signal quality measured on the CMR,
    determines interference power according to signal quality measured on the IMR, and
    determines a signal to interference plus noise ratio between the transmitting beam and the receiving beam according to the signal power and the interference power;
    wherein the processing circuitry is further configured to:
    configure N IMRs, and configure one or more CMRs for each IMR, the one or more CMRs corresponding to a same transmitting beam, wherein N is an integer greater than or equal to 1; and send a downlink signal to the user equipment with the transmitting beam, such that the user equipment:

receives the downlink signal with each receiving beam among one or more receiving beams, determines signal power according to signal quality measured on the one or more CMRs, determines interference power according to signal quality measured on all or part of the N IMRs, and determines a signal to interference plus noise ratio between the transmitting beam and the receiving beam according to the signal power and the interference power.

7. The electronic device according to claim 6, wherein the processing circuitry is further configured to:

receive, from the user equipment, signal to interference plus noise ratio information comprising signal to interference plus noise ratios between the transmitting beam and one or more receiving beams.

8. An electronic device, comprising a processing circuitry, configured to:

receive a downlink signal from each of K transmitting beams from a network-side device with a same receiving beam, wherein K is an integer greater than 1, the network-side device is configured with K channel measurement resources (CMRs) in one-to-one correspondence to the K transmitting beams, and each of the K CMRs is configured with one or more interference measurement resources (IMRs);

determine signal power according to signal quality measured on the CMR corresponding to the transmitting beam;

determine interference power according to signal quality measured on all or part of the IMRs corresponding to the CMR; and determine a signal to interference plus noise ratio between the transmitting beam corresponding to the CMR and the receiving beam according to the signal power and the interference power.

9. The electronic device according to claim 8, wherein the processing circuitry is further configured to:

send signal to interference plus noise ratio information to the network-side device, wherein the signal to interference plus noise ratio information comprises signal to interference plus noise ratios between one or more transmitting beams among the K transmitting beams and the receiving beam.

10. The electronic device according to claim 8, wherein the processing circuitry is further configured to:

acquire one or more IMRs configured for each CMR through radio resource control (RRC) signaling; and determine interference power according to signal quality measured on all the IMRs corresponding to the CMR.

11. The electronic device according to claim 8, wherein the processing circuitry is further configured to:

acquire one or more IMRs configured for each CMR through radio resource control (RRC) signaling;

acquire one or more activated IMRs among the IMRs corresponding to the CMR through medium access control (MAC) signaling or downlink control information (DCI); and determine interference power according to signal quality measured on the activated IMR corresponding to the CMR.

12. The electronic device according to claim 8, wherein the processing circuitry is further configured to:

select one or more IMRs from the IMRs corresponding to each CMR; and determine interference power according to signal quality measured on the selected IMR.

13. An electronic device, comprising a processing circuitry, configured to:

receive, with a receiving beam, a downlink signal of a transmitting beam corresponding to one or more channel measurement resources (CMRs) from a network-side device, wherein the network-side device is configured with one or more CMRs and one or more interference measurement resources (IMRs);

determine signal power according to signal quality measured on the CMR;

determine interference power according to signal quality measured on the IMR; and determine a signal to interference plus noise ratio between the transmitting beam and the receiving beam according to the signal power and the interference power;

wherein the processing circuitry is further configured to:

receive, with each receiving beam among one or more receiving beams, a downlink signal of a same transmitting beam from the network-side device, wherein the network-side device is configured with N IMRs, each of the N IMRs is configured with one or more CMRs, the one or more CMRs correspond to the same transmitting beam, and N is an integer greater than or equal to 1;

determine signal power according to signal quality measured on the one or more CMRs;

determine interference power according to signal quality measured on all or part of the N IMRs; and determine a signal to interference plus noise ratio between the transmitting beam and the receiving beam according to the signal power and the interference power.

14. The electronic device according to claim 13, wherein the processing circuitry is further configured to:

send signal to interference plus noise ratio information to the network-side device, wherein the signal to interference plus noise ratio information comprises the signal to interference plus noise ratio between the transmitting beam and one or more receiving beams.

15. The electronic device according to claim 13, wherein the processing circuitry is further configured to:

acquire the N IMRs through radio resource control (RRC) signaling; and determine interference power according to signal quality measured on the N IMRs.

16. The electronic device according to claim 13, wherein the processing circuitry is further configured to:

acquire the N IMRs through radio resource control (RRC) signaling;

acquire one or more activated IMRs among the N IMRs through medium access control (MAC) signaling or downlink control information (DCI); and determine interference power according to signal quality measured on the activated IMR.

17. The electronic device according to claim 13, wherein the processing circuitry is further configured to:

select one or more IMRs from the N IMRs; and determine interference power according to signal quality measured on the selected IMRs.

18. A wireless communication method performed by an electronic device, comprising:

configuring K channel measurement resources (CMRs) in one-to-one correspondence to K transmitting beams, and configure, for each of the K CMRs, one or more interference measurement resources (IMRs) corresponding to the CMR, wherein K is an integer greater than 1; and sending a downlink signal to a user equipment with each transmitting beam among the K transmitting beams, such that the user equipment:

receives a downlink signal from each transmitting beam with a same receiving beam, determines signal power according to signal quality measured on a CMR corresponding to the transmitting beam, determines interference power according to signal quality measured on all or part of the IMRs corresponding to the CMR, and determines a signal to interference plus noise ratio between the transmitting beam and the receiving beam according to the signal power and the interference power.

* * * * *